(12) United States Patent
Puffer

(10) Patent No.: US 7,841,555 B2
(45) Date of Patent: Nov. 30, 2010

(54) CARTRIDGE AND METHOD FOR HANDLING THIN FILM MEMBRANES

(76) Inventor: Raymond Puffer, 196 Boght Rd., Watervliet, NY (US) 12189

( * ) Notice: Subject to any disclaimer, the term of this patent is extended or adjusted under 35 U.S.C. 154(b) by 392 days.

(21) Appl. No.: 11/572,839

(22) PCT Filed: Jul. 29, 2005

(86) PCT No.: PCT/EP2005/008237
§ 371 (c)(1),
(2), (4) Date: Jan. 29, 2007

(87) PCT Pub. No.: WO2006/010626
PCT Pub. Date: Feb. 2, 2006

(65) Prior Publication Data
US 2008/0042003 A1 Feb. 21, 2008

(51) Int. Cl.
*B65H 18/08* (2006.01)
(52) U.S. Cl. ............... 242/538.2; 242/538.3; 242/538.4
(58) Field of Classification Search ... 242/538.2–538.4, 242/341, 345, 347; 396/511–516
See application file for complete search history.

(56) References Cited

U.S. PATENT DOCUMENTS

| 367,176 | A | * | 7/1887 | Barker | 396/284 |
|---|---|---|---|---|---|
| 3,684,206 | A | * | 8/1972 | Edwards | 396/387 |
| 3,780,635 | A | * | 12/1973 | Prochnow | 396/512 |
| 4,432,625 | A | * | 2/1984 | Harvey | 396/512 |
| 4,883,234 | A | * | 11/1989 | Yamakawa et al. | 242/423.1 |
| 4,894,674 | A | * | 1/1990 | Radov | 396/511 |
| 5,015,089 | A | * | 5/1991 | Radov | 352/235 |
| 6,267,313 | B1 | * | 7/2001 | Saliba et al. | 242/345 |
| 2004/0042789 | A1 | | 3/2004 | Puffer et al. | |
| 2005/0281981 | A1 | | 12/2005 | Puffer et al. | |

FOREIGN PATENT DOCUMENTS

| EP | 0379344 A2 | 7/1990 |
|---|---|---|
| GB | 2272885 A | 6/1994 |
| JP | 58182670 | 10/1983 |
| JP | 03267984 | 11/1991 |
| JP | 03267985 | 11/1991 |

* cited by examiner

*Primary Examiner*—Sang Kim
(74) *Attorney, Agent, or Firm*—Hammer & Associates, P.C.

(57) ABSTRACT

A cartridge and a method for handling thin film membranes using a cartridge are disclosed. The cartridge may be used to handle any thin-film material, but is particularly useful in handling the thin membrane materials used in fabricating Membrane Electrode Assemblies (MEA) for fuel cells. In one aspect, the cartridge includes cavities positioned at opposite ends of a frame. The cavities and associated mounting arrangements are adapted to accept spools for dispensing membrane material and drawing it across the frame. The cartridge also includes a removable cover having an aperture through which the membrane material may be accessed and, for example, cut to a desired shape. Aspects also include methods and apparatus for advancing the membrane in the cartridge. Aspects of the present invention provide improved methods and devices that facilitate the handling and assembly of thin film membranes into membrane-containing devices, such as, fuel cells.

7 Claims, 20 Drawing Sheets

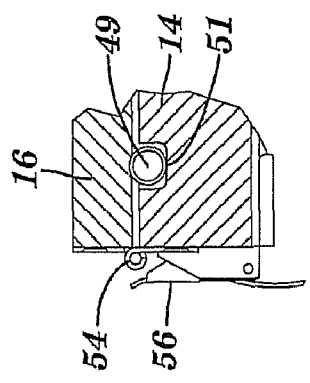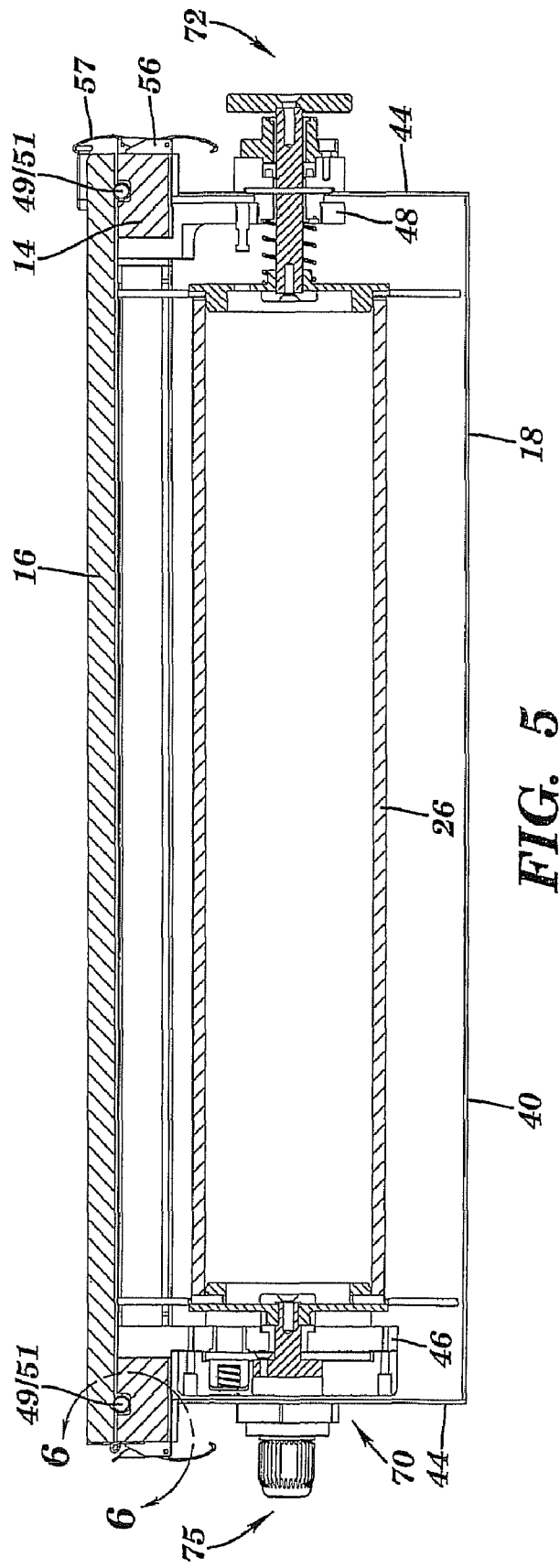

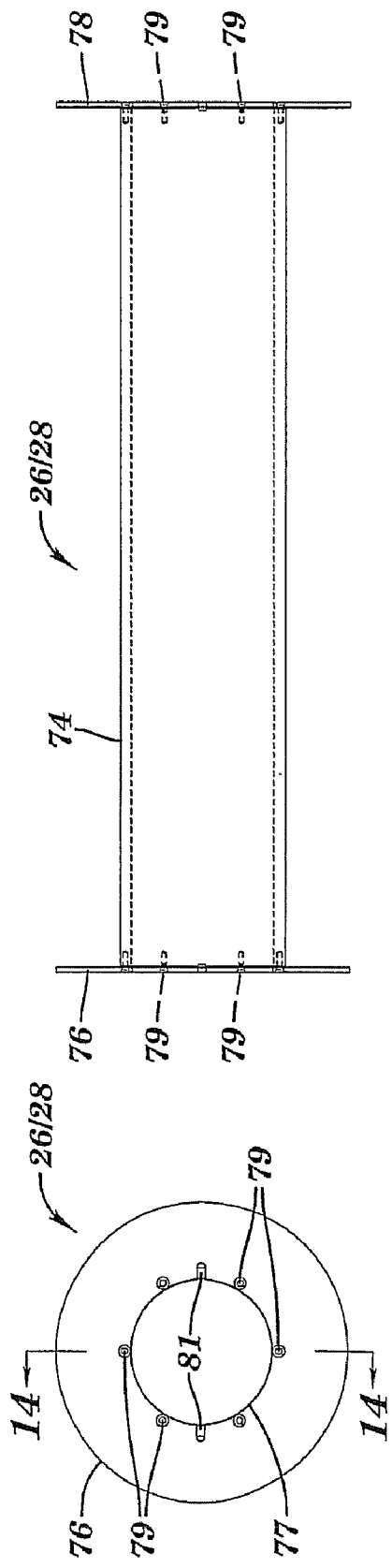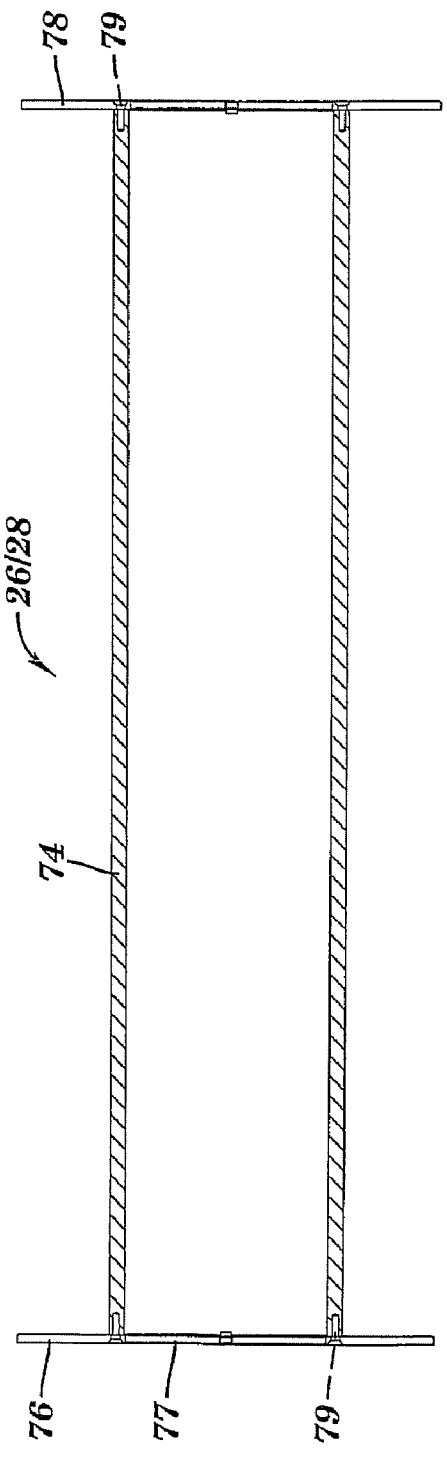
FIG. 12
FIG. 13
FIG. 14

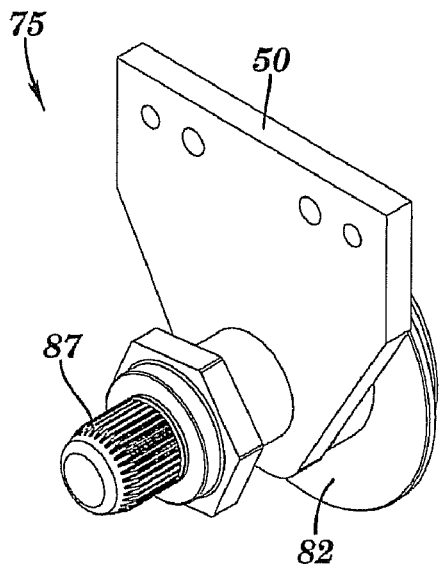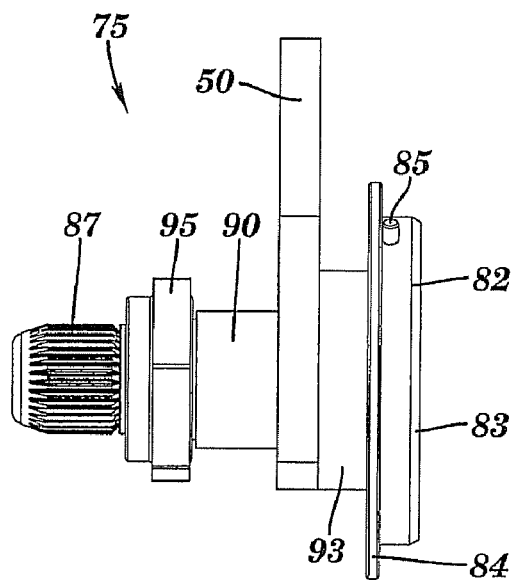
FIG. 15  FIG. 16
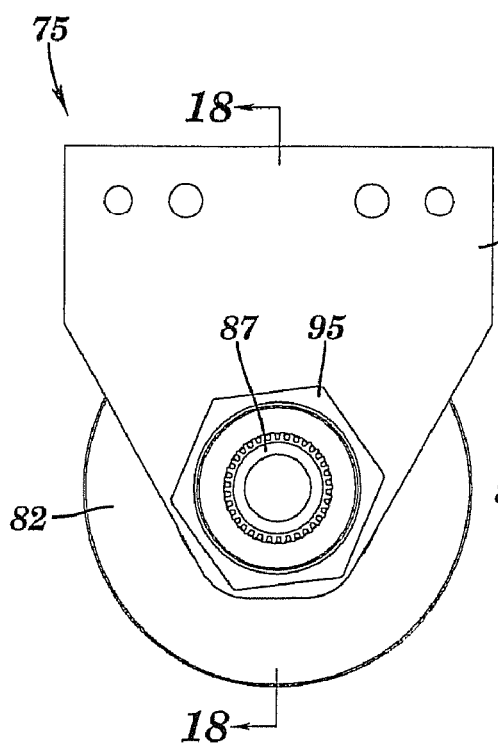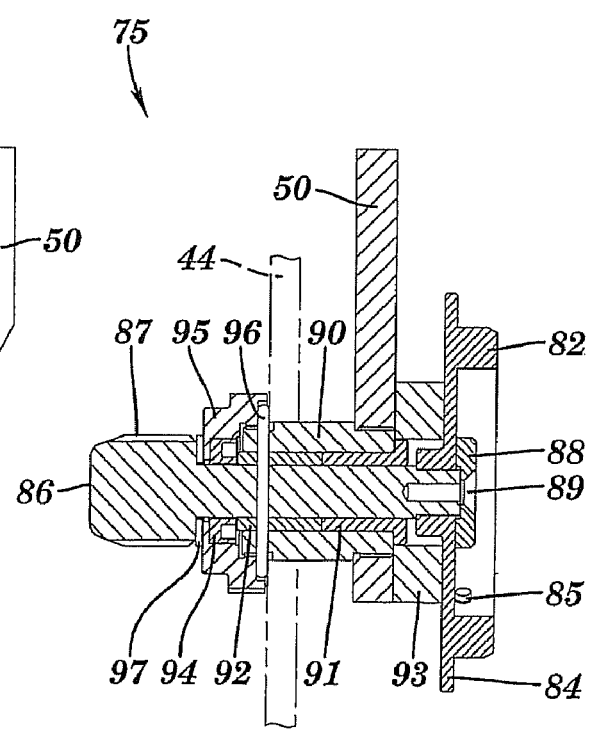
FIG. 17  FIG. 18

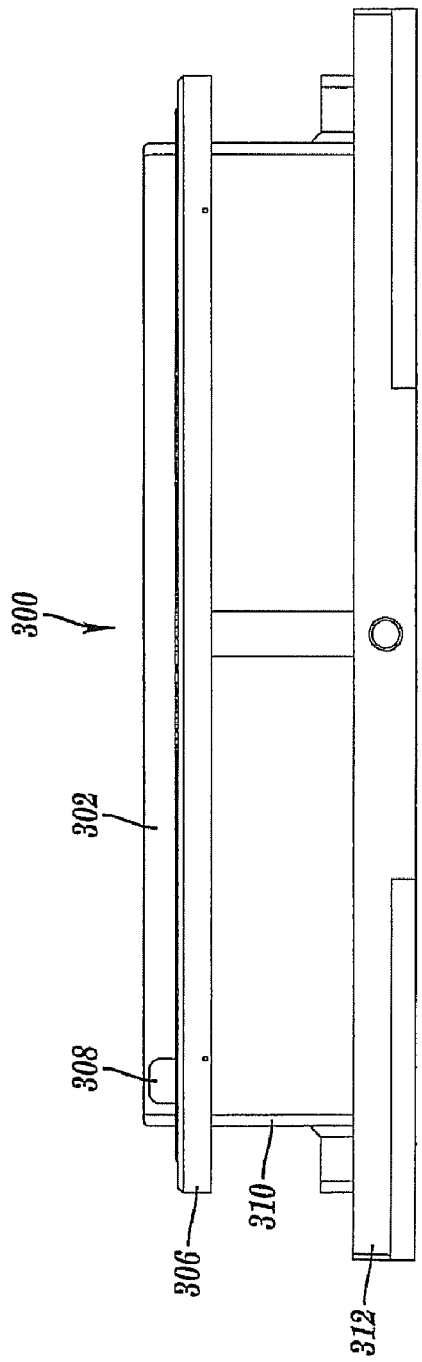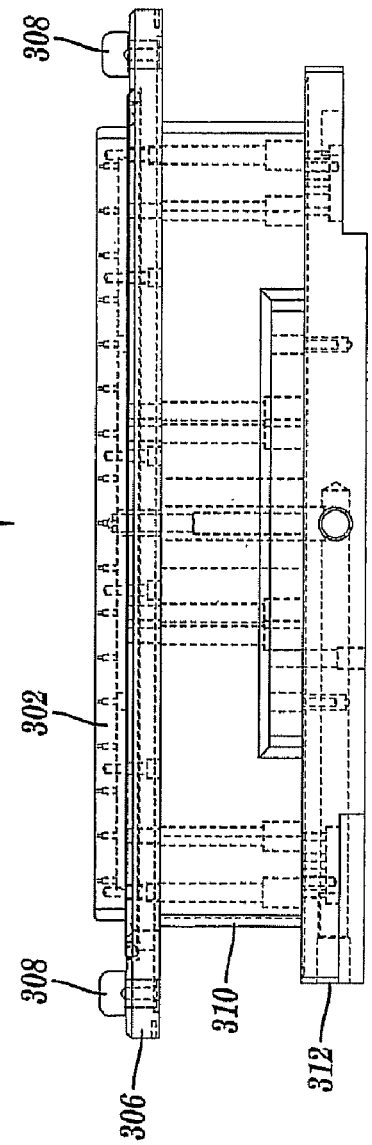

CARTRIDGE AND METHOD FOR HANDLING THIN FILM MEMBRANES

REFERENCE TO RELATED APPLICATIONS

This application contains subject matter that is related to the subject matter of the following applications, each of which is assigned to the same assignee as this application. Each of the below listed applications is hereby incorporated herein by reference in its entirety:

U.S. patent application Ser. No. 10/232,424 filed on 30 Aug. 2002, entitled "METHOD AND APPARATUS FOR TRANSFERRING THIN FILMS FROM A SOURCE POSITION TO A TARGET POSITION", and published as U.S. application US 20040042789 A1 on 4 Mar. 2004; and U.S. Patent Application Publication No. 2005/0281981 which corresponds to PCT application PCT/EP2003/00920 filed on 20 Aug. 2003, entitled "FIXTURES AND METHODS FOR FACILITATING THE FABRICATION OF DEVICES HAVING THIN FILM MATERIALS," and published as PCT publication WO 2004/021489 A2 on 11 Mar. 2004.

TECHNICAL FIELD

This invention relates generally to methods and devices used for handling thin films, for example, thin-film membranes. Specifically, the present invention provides methods and devices employing cartridge-type enclosures for handling membranes used in the fabrication of membrane electrode assemblies for fuel cells.

BACKGROUND OF THE INVENTION

Thin film-like materials are handled in many different types of industries, for example, in photographic and x-ray film manufacture and processing, membrane manufacture and processing, packaging, printing, and electronics, among others. The thin, flexible, and often fragile nature of film-like materials typically requires special considerations when handling these materials, for example, to prevent tearing, distortion, and breakage, and to ensure proper orientation and alignment during assembly.

One field in which the handling of thin film-like materials is often problematic is the field of fuel cells, for example, during the handling and assembly of electrodes mounted on thin-film gaskets found in Membrane Electrode Assemblies (or MEAs). MEAs typically consist of several layers of thin materials (that is, materials having a thickness of about 0.001 inches) which are assembled with layer-to-layer registration or alignment tolerances of a few thousandths of an inch. In some types of MEAs, the MEA typically includes two layers of gasket material, two electrodes, and one membrane, for example, a proton exchange membrane (PEM). These components are typically cut to appropriate size and assembled with dimensional tolerances of a few thousandths of an inch. Typically, prior art MEA assembly processes consist of several diverse operations that must be performed in a prescribed sequence, typically requiring the materials to be transported between assembly stations during processing. The handling of the components of the MEA, for example, the thin gaskets, the thin electrodes, and the thin membrane is typically hampered by the flexibility and fragility that characterizes these thin materials.

According to the prior art, membranes and the assembly of these membranes into, for example, MEAs, is typically assembled by hand, one at a time. In order for fuel cells to become economically viable it is preferred that the fabrication and assembly of the components of MEAs and the MEAs themselves be automated. However, the transport and registration (that is, alignment) of multiple layers of thin film materials presents a particularly difficult challenge for prior art fabrication methods. Aspects of the inventions shown in published applications US 20040042789 A1 and WO 2004/021489 A2 provide devices and methods for automating the assembly of MEAs. However, the prior art methods and devices for providing membranes, for example, providing membranes to an automated system as disclosed in these applications, limit the effectiveness and ease with which membranes, for example, can be introduced to an automated system.

According to the prior art, membranes are typically provided in an acidic solution in sealed bags, for example, as shown in above-referenced U.S. application 20040042789 A1. Also shown in application US 20040042789 A1, according to the existing art, these bags must typically be opened, for example, by cutting, and the membrane extracted from the bag before the electrode can be handled and assembled to provide an MEA. This extraction of the membrane from the bag is typically cumbersome and detracts from the desire to automate the handling and assembly of, among other things, MEAs. Aspects of the present invention address these and other disadvantages of the prior art by providing methods and devices for providing and handling thin films, for example, membranes. Aspects of the present invention are particularly conducive to the automated assembly of devices having membranes, for example, to the automated assembly of MEAs for use in fuel cells.

SUMMARY OF THE INVENTION

One aspect of the invention relates to a cartridge for handling a thin film membrane, the cartridge including a frame having a first end and a second end; a first cavity positioned adjacent the first end of the frame comprising a source of the thin film membrane; and a cover mounted above the frame, the cover having an aperture for providing access to the thin film membrane. In one aspect of the invention, the cartridge further comprises a second cavity positioned adjacent the second end of the frame comprising a depository for the thin film membrane.

Another aspect of the invention relates to a method for handling thin film membranes using a cartridge, the cartridge including a frame having a first end and a second end; a first cavity positioned at the first end of the frame comprising a source of the thin film membrane; and a cover mounted above the frame, the cover having an aperture for providing access to the thin film membrane, the method including providing a thin film membrane in the first cavity; extracting the thin film membrane from the first cavity and positioning the thin film membrane beneath the aperture in the cover; and handling the thin film membrane via the aperture in the cover. In one aspect of the invention, extracting the thin film from the first cavity comprises drawing the thin film from a spool mounted in the first cavity. In another aspect of the invention, the cartridge comprises a second cavity positioned adjacent the second end of the frame, and the method further comprises, after handling, forwarding the thin film membrane to the second cavity.

The cartridge may include a frame having a first end and a second end; a first cavity positioned adjacent the first end of the frame; a second cavity positioned adjacent the second end of the frame; a first spool mounted for rotation in the first cavity, the first spool having a thin-film membrane mounted thereon; a second spool mounted for rotation in the second cavity, the second spool adapted to receive the thin-film membrane; and a cover mounted above the frame, the cover having an aperture for providing access to the thin film membrane. In one aspect of the invention, the cartridge further comprises means for conveying the thin film membrane from the first cavity to the second cavity.

These and other embodiments and aspects of the present invention will become more apparent upon review of the attached drawings, description below, and attached claims.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed descriptions of the preferred embodiments and the accompanying drawings in which:

FIG. 5 is a cross-sectional view of the cartridge shown in FIG. 3 through the feed roller as viewed along section lines 5-5 in FIG. 3.

FIG. 6 is a detailed view of the detail 6-6 shown in FIG. 5.

FIG. 12 is a front elevation view of the spool shown in FIGS. 2, 5, and 7 according to one aspect of the invention.

FIG. 13 is a side elevation view of a spool shown in FIG. 12.

FIG. 14 is a cross-sectional view of the spool shown in FIG. 13 as viewed along lines 14-14 in FIG. 13.

FIG. 15 is perspective view of the driven spline take-up assembly shown in FIGS. 5 and 7 according to another aspect of the invention.

FIG. 16 is a side elevation view of the driven spline take-up assembly shown in FIG. 15.

FIG. 17 is a front elevation view of the driven spline take-up assembly shown in FIG. 15.

FIG. 18 is a cross sectional view of the driven spline take-up assembly shown in FIGS. 15 though 17 as viewed along lines 18-18 in FIG. 17.

FIG. 28 is a front elevation view of the vacuum table assembly shown in FIG. 27.

FIG. 29 is a side elevation view, showing internal passages in phantom, of the vacuum table assembly shown in FIG. 27.

DETAILED DESCRIPTION OF THE PREFERRED EMBODIMENTS

The details and scope of the aspects of the present invention can best be understood upon review of the attached figures and their following descriptions.

Figure 1:
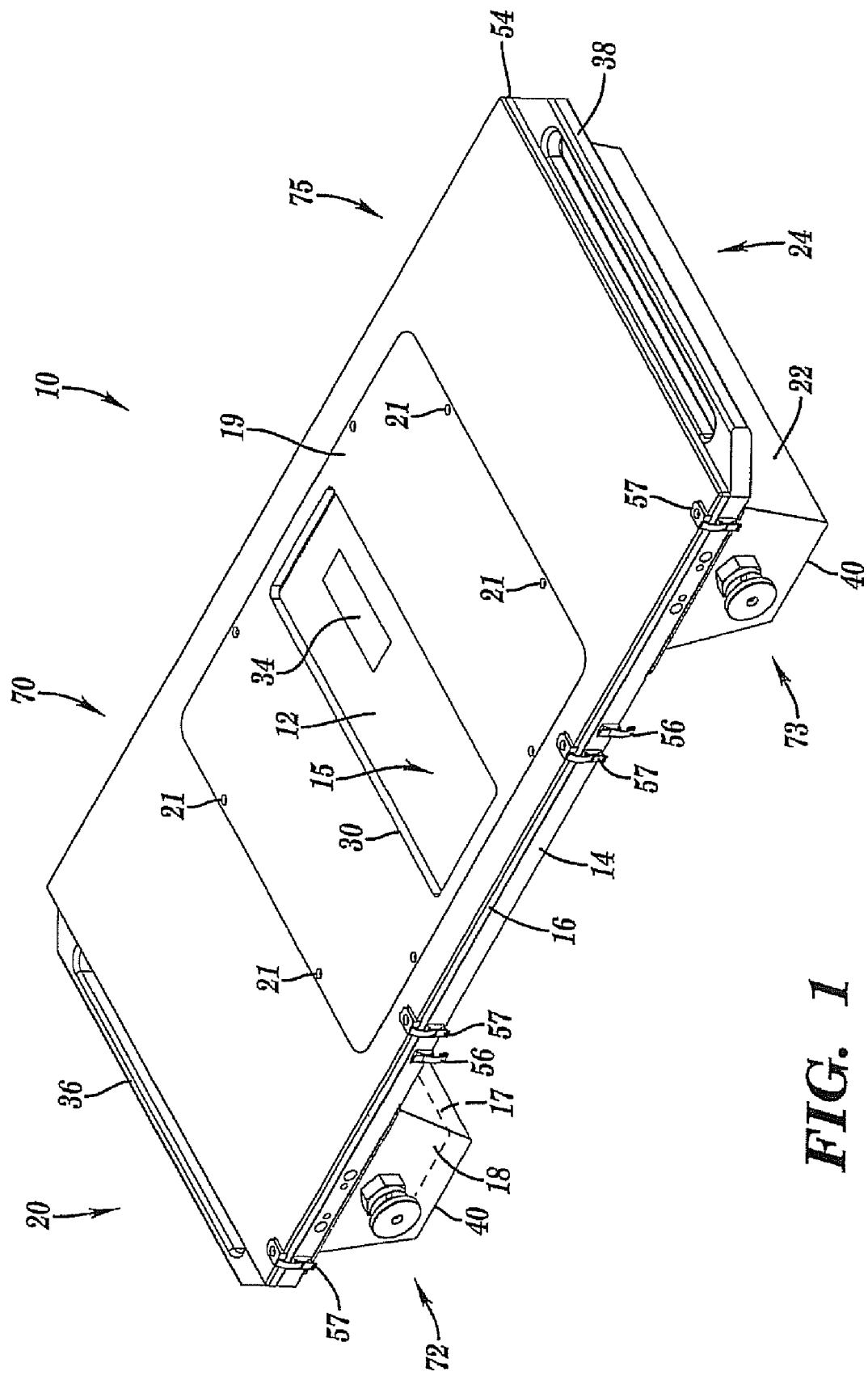
FIG. 1 is a perspective view of a cartridge for handling a thin film membrane according to one aspect of the present invention.
Figure 2:
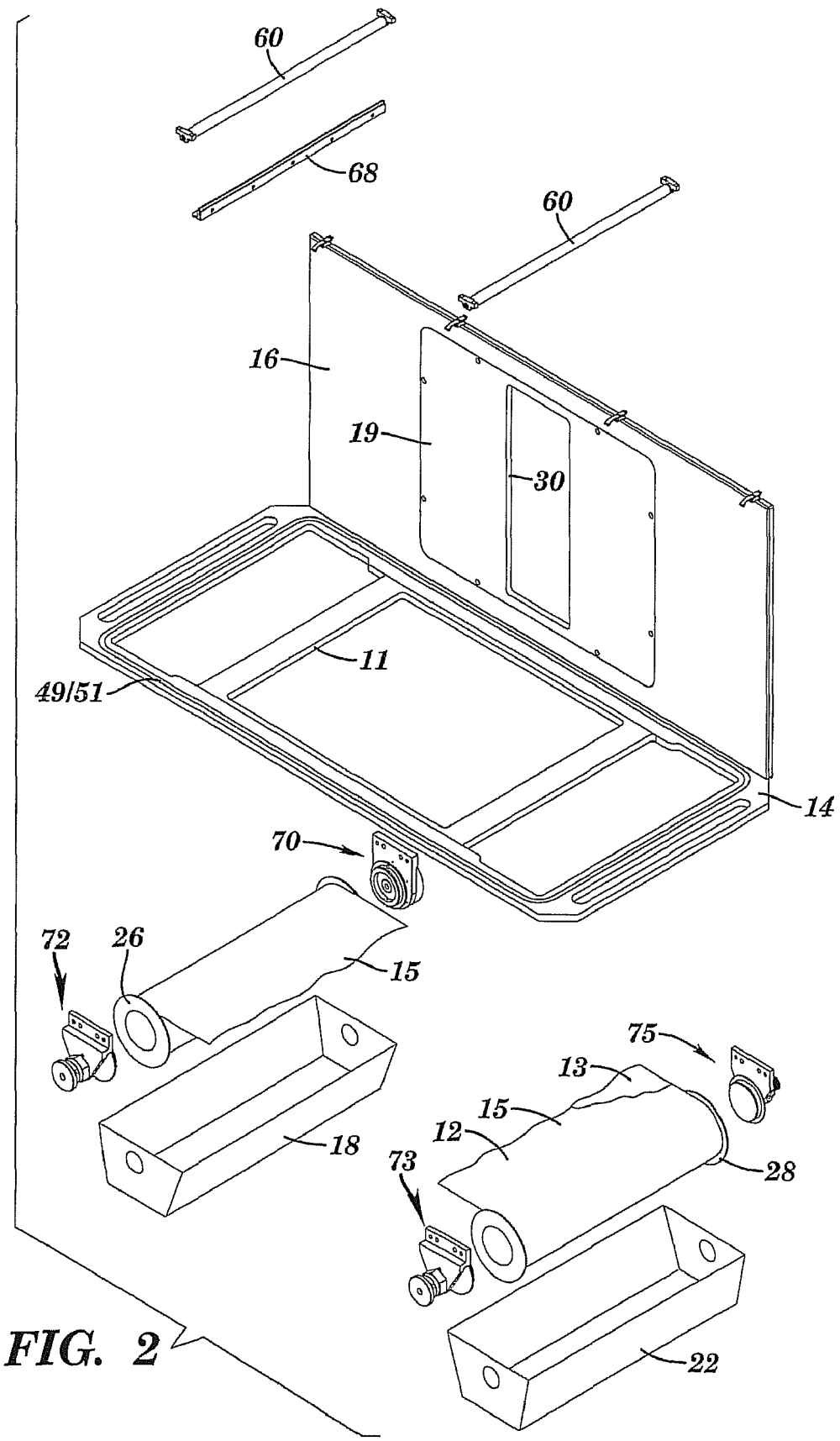
FIG. 2 is an exploded perspective view of the cartridge shown in FIG. 1.
Figure 3:
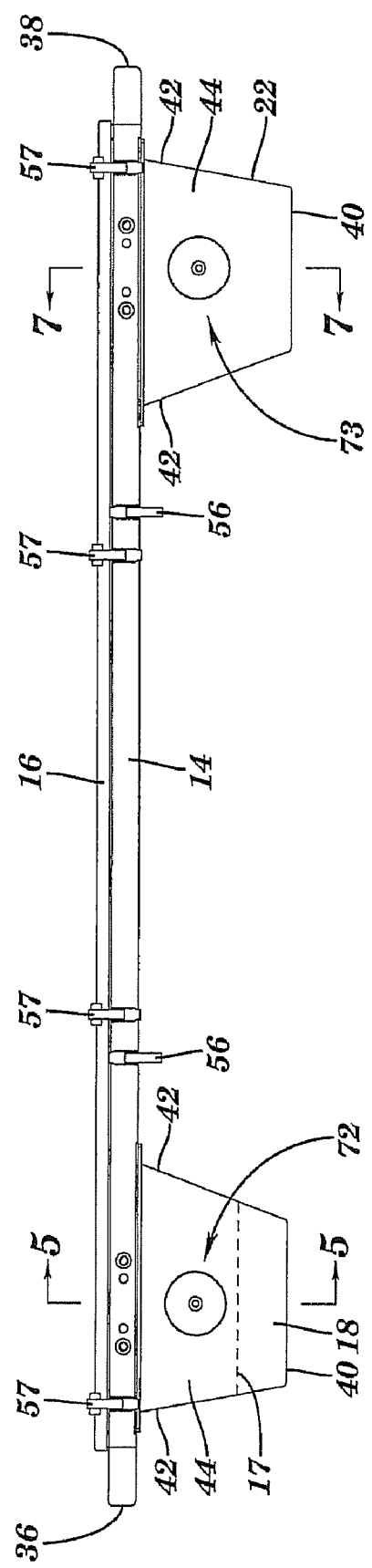
FIG. 3 is a front elevation view of the cartridge shown in FIG. 1.
Figure 4:
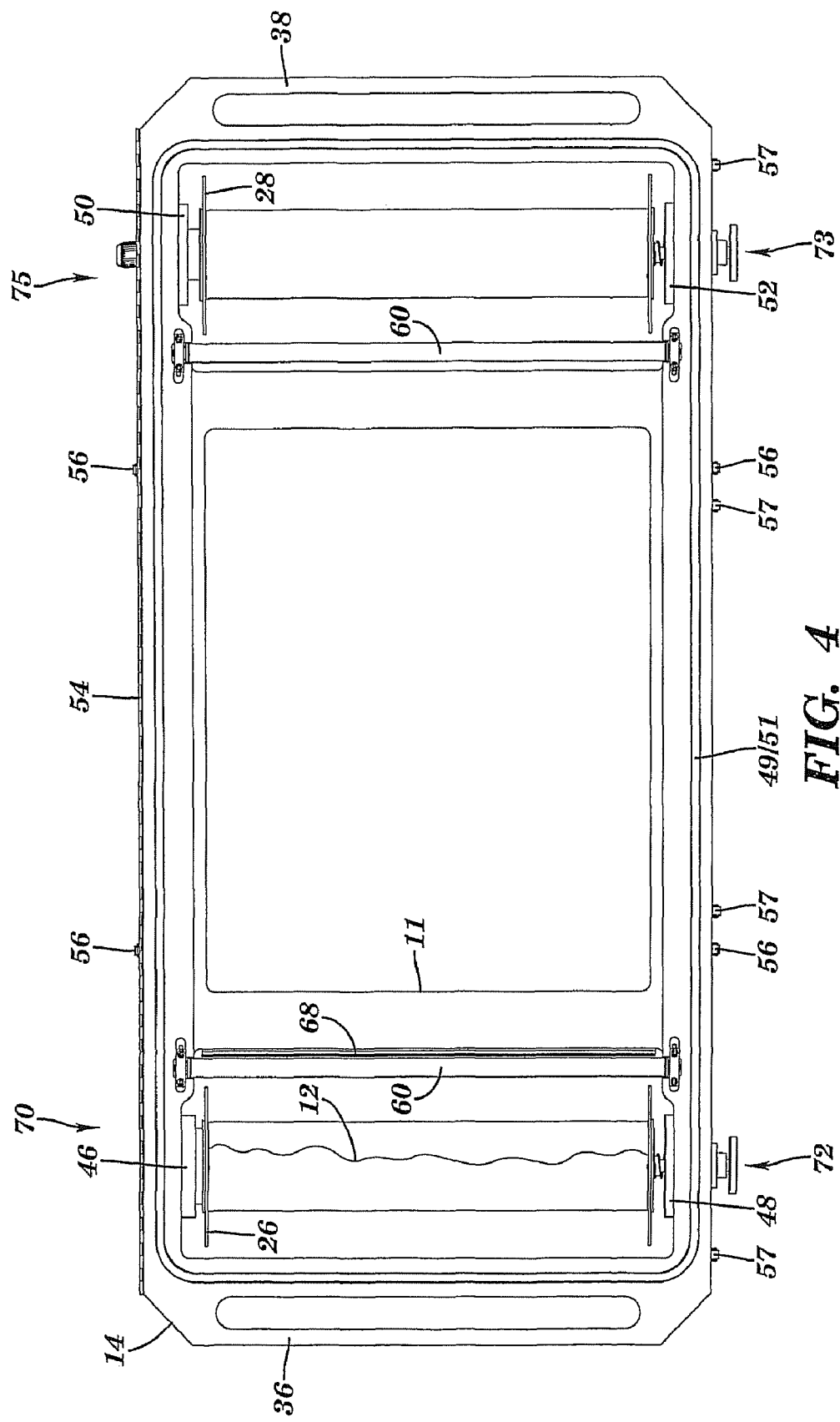
FIG. 4 is a top plan view of the cartridge shown in FIGS. 1 through 3 with the cover removed.

FIG. 1 is a perspective view of a cartridge assembly 10 for handling a thin film membrane 12 according to one aspect of the present invention. FIG. 2 is an exploded perspective view of cartridge assembly 10 shown in FIG. 1. FIG. 3 is a front elevation view of cartridge assembly 10 shown in FIG. 1, and FIG. 4 is a top plan view of the cartridge assembly 10 shown in FIGS. 1 through 3 with the cover removed. As shown in these figures, cartridge assembly 10 includes a base or frame 14 and a cover 16. According to this aspect of the invention, base or frame 14 includes a first cavity 18 at a first end 20 and a second cavity 22 at a second end 24. First cavity 18 and second cavity 22 are adapted to receive spools 26 and 28 (see FIGS. 2 and 4). Spools 26 and 28 are adapted to have a thin-film membrane wound around them, for example, thin-film membrane 12. Cover 16 is adapted to mount upon base 14. Cover 16 includes at least one aperture 30 through which thin-film membrane 12 may be accessed. In one aspect of the invention, cover 16 may include a replaceable insert 19 in which aperture 30 is located, for example, mounted by means of threaded fasteners 21. In this aspect of the invention, insert 19 having aperture 30 may be used to vary the size or shape of aperture 30. Thin-film membrane 12 may be mounted on a backing material or carrier 13 (see FIG. 2) to facilitate handling of thin-film membrane 12. In the following discussion, the assembly of thin-film membrane 12 on backing material 13 will be referred to as "membrane assembly 15". In one aspect of the invention, aperture 30 may be provided with an aperture cover (not shown) adapted to be removablely installed over aperture 30.

The illustration of the various aspects of the present invention shown in the figures is intended to illustrate the aspects of the present invention as clearly as possible. Since some of the structures are relatively thin in cross-section, for example, membrane assembly 15, for the sake of clarity, the dimensions (most notably the thickness) of these structures may be exaggerated, that is, not drawn to scale. The text of this specification provides ranges of dimensions for most structures that should be relied upon when the depictions in the figures are not to scale. Membrane assembly 15 may have a broad range of thickness according to the present invention, depending upon the type of thin film being handled by cartridge assembly 10. In one aspect of the invention, thin-film membrane 12 may have a thickness that ranges from about 1 micrometer (about 0.00004 inches) to about 500 micrometers (about 0.020 inches), and may typically have a thickness that ranges from about 25 micrometers (about 0.001 inches) to about 200 micrometers (about 0.008 inches).

According to this aspect of the invention, base 14 and cover 16 provide a convenient cartridge assembly 10 for handling membrane assembly 15. For example, when introducing a thin-film membrane 12 to an assembly process, membrane assembly 15 may be provided on spool 26 mounted in first cavity 18. Similar to the handling of photographic film, membrane assembly 15 may be drawn across base 14 and attached to spool 28. Spool 28 may then be rotated to draw membrane assembly 15 from spool 26 across base 14 onto spool 28. After membrane assembly 15 is drawn across base 14, aperture 30 in cover 16 permits access to membrane 12, for example, for processing and removal. For example, in one aspect of the invention, aperture 30 may provide access to a cuffing device, for instance, a die-type cutting device, for cutting membrane 12 to a desired size, for example, as indicated by cut membrane section 34. After cutting, cut membrane section 34 may be removed from backing 13 and handled as desired, for example, transported for further processing or installation into an assembly, for example, into an MEA.

In one aspect of the invention, the membrane 12 may be provided in an aqueous medium, for example, an acidic or caustic aqueous medium, for instance, to maintain a desired pH for membrane 12. In this aspect of the invention, base 14, cover 16, spools 26 and 28, and cavities 18 and 22 are made from a corrosion-resistant material, for example, from a corrosion-resistant, such as polyvinylchloride (PVC) plastic or a corrosion-resistant stainless steel, such as, AISI 316 stainless steel. In one aspect of the invention, at least cavity 18 may be provided with a level 17 of aqueous medium, for example, to provide a reservoir of aqueous medium to maintain membrane 12 at the desired acidity or causticity. In one aspect of the invention, membrane 12 may be maintained in an acid medium, for example, a phosphoric acid medium, for instance, a phosphoric acid medium at about a 75% acid concentration.

As shown in FIGS. 1 through 4, base 14 may typically be rectangular in shape. However, in one aspect of the invention, base 14 may take any geometric shape that is conducive to the handling or assembly process to which cartridge assembly 10 is to be used. For example, base 14 may be rectangular, square, circular, oval, or any polygonal shape. Base 14 may include one or more handles to facilitate manual handling of cartridge assembly 10. For example, base 14 may include a handle 36 on first end 20 and a handle 38 on second end 24. Cartridge assembly 10 may also include one or more structures that facilitate handling by automated means, for example, by means of robotic arm-end manipulators or by means of a conveyor. For instance, though not shown, cartridge assembly 10 may include rings or knobs that facilitate automated handling of cartridge assembly 10. Base 14 may also include at least one aperture 11 for permitting access to the bottom of membrane assembly 15, for example, for exposing membrane assembly 15 to a means for retaining membrane assembly 15, for instance, a vacuum table. However, in one aspect of the invention, base 14 may include no apertures 11, but may comprise a relatively flat surface upon which membrane assembly 15 may rest, for example, rest during handling or cutting.

According to one aspect of the invention, base 14 and cover 16 may be metallic or non-metallic. For example, base 14 and cover 16 may be fabricated from one or more of the following metals: iron, steel, stainless steel, aluminum, titanium, nickel, magnesium, or any other structural metal; or base 14 and cover 16 may be fabricated from one or more of the following plastics: nylon, polyethylene (PE), polypropylene (PP), polyester (PE), polytetraflouroethylene (PTFE), acrylonitrile butadiene styrene (ABS), or polyvinylchloride (PVC), among other plastics. In one aspect of the invention, base 14 and cover 16 are made from PVC plastic. In one aspect of the invention, base 14 and cover 16 may be about the same size. For example, in one aspect, base 14 and cover 16 may each have a length of between about 6 inches and about 20 feet, but are typically between about 1 foot and about 5 feet in length. In one aspect, base 14 and cover 16 may each have a width of between about 3 inches and about 10 feet, but are typically between about 1 foot and about 3 feet in width. In one aspect base 14 and cover 16 may each have a thickness of between about 0.125 inches and about 1 foot, but are typically between about 0.25 inches and about 1 inch in thickness.

First cavity 18 and second cavity 22 may comprise any cavity adapted to retain a thin-film membrane. In the aspect of the invention shown in FIGS. 1 through 4, cavities 18 and 22 are adapted to retain spools 26 and 28 in a horizontal position. As shown in FIGS. 1, 2, and 3, cavities 18 and 22 may comprise hollow, truncated frusto-conical structures. However, in other aspects of the invention, cavities 18 and 20 may comprise hollow cylindrical structures, for example, hollow circular or semi-circular cylindrical structures or hollow rectangular cylindrical structures. In the aspect of the invention shown in FIGS. 1, through 4, cavities 18 and 20 include bottom panels 40, side panels 42, and end panels 44. In one aspect of the invention, cavities 18 and 20 may be fabricated as integral parts of base 14, for example, molded, forged, welded, or otherwise formed as a single piece. Cavities 18 and 10 may also be fabricated as individual parts and mounted to base 14, for example, by means of conventional mechanical fasteners, fusion (for example, welding or brazing), or using adhesives.

As shown in FIGS. 2 ands 4, spools 26 and 28 may be mounted, for example, rotatably mounted, in cavities 18 and 22, respectively, by means of spool mounting gussets 46, 48, 50, and 52, respectively. Gussets 46, 48, 50, and 52, may be mounted to base 14 by conventional means, for example, by means of mechanical fasteners or welding. The details of the mounting of spools 26 and 28 are shown and described with respect to FIGS. 5 and 7.

FIG. 5 is a cross-sectional view through the feed spool of the cartridge assembly 10 shown in FIG. 3 as viewed along section lines 5-5 in FIG. 3. As shown in FIG. 5, feed spool 26 is mounted to gussets 46 and 48 (which are mounted to base 14) by means of payout tensioner assembly 70 and load handle assembly 72. A detailed description of feed spool 26 is shown and described with respect to FIGS. 12, 13, and 14. Details of payout tensioner assembly 70 are provided in FIGS. 23 through 26; details of load handle assembly 72 are provided in FIGS. 19 through 22.

FIG. 6 is a detailed view of the detail 6-6 shown in FIG. 5. FIG. 6 illustrates a cross sectional view of cartridge assembly 10 in the vicinity of a seal 49. Seal 49 may be provided between base 14 and cover 16 to limit or prevent the passage of the aqueous medium, in which membrane assembly 15 may be provided, from cartridge assembly 10. Seal 49 may typically be positioned in a channel 51 in base 14. As shown in FIG. 4, channel 51 having seal 49 may at least partially encircle base 14. Typically, channel 51 having seal 49 makes one continuous circuit about base 14. In this aspect of the invention, seal 49 may typically at least partially protrude from channel 51 whereby, when cover 16 is closed, the surface of cover 16 impinges seal 49 to provide a substantially fluid tight seal between cover 16 and base 14. In one aspect, seal 49 may be provided by an elastomeric material, for example, a corrosion-resistant elastomeric material. In one aspect of the invention, seal 49 may be made from a fluoroelatomer, such as, Dupont's Viton® fluoroelastomer, or its equivalent. As shown in FIG. 6, seal 49 may comprise a hollow tube, for example, a circular hollow tube. Seal 49 may have a diameter ranging from about 0.25 inches to 2 inches. In one aspect of the invention, seal 49 may comprise a high-temperature Viton rubber tubing having a part number 5119K33 provided by McMaster-Carr Supply Company of Atlanta, Ga., or its equivalent.

As shown in FIGS. 1 and 2, cover 16 may be mounted to base 14 by conventional means, for example, by means of mechanical fasteners. As shown in FIG. 2, in one aspect of the invention, cover 16 may be pivotally mounted to base 14 by means of hinge 54. FIG. 6 also illustrates a cross-section of a typical hinge 54 for pivotally mounting cover 16 to base 14. Hinge 54 may comprise any conventional continuous or intermittent (for example, multiple) hinge arrangement for pivotally mounting cover 16 to base 14. FIG. 6 also shows a latch 56. Latch 56 may be used to secure cartridge assembly 10 to another structure. For example, in one aspect of the invention latch 56 may be used to secure cartridge assembly 10 to a vacuum table, for example, to vacuum table 300 shown in FIGS. 27, 28 and 29. In one aspect of the invention, latch 56 may comprises a draw latch, for example, a draw latch having a part number 97-30-163-12 provided by the supplier Southco of Concordville, Pa., or its equivalent. As shown in FIGS. 1 through 7, cartridge assembly 10 may include a plurality of latches 56 evenly distributed about cartridge assembly 10.

Cartridge assembly 10 may also include one or more latches 57. Latches 57 may be used to secure cover 16 to base 14 of cartridge assembly 10. In one aspect of the invention, latches 57 may comprise latches similar to latches 56 above, for example, draw latches having a part number 97-30-163-12 provided by Southco, or its equivalent. As shown in FIGS. 1 through 7, cartridge assembly 10 may include a plurality of latches 57 evenly distributed about cartridge assembly 10, for example, evenly distributed about along the edge opposite hinge 54 of cartridge assembly 10.

Figure 7:
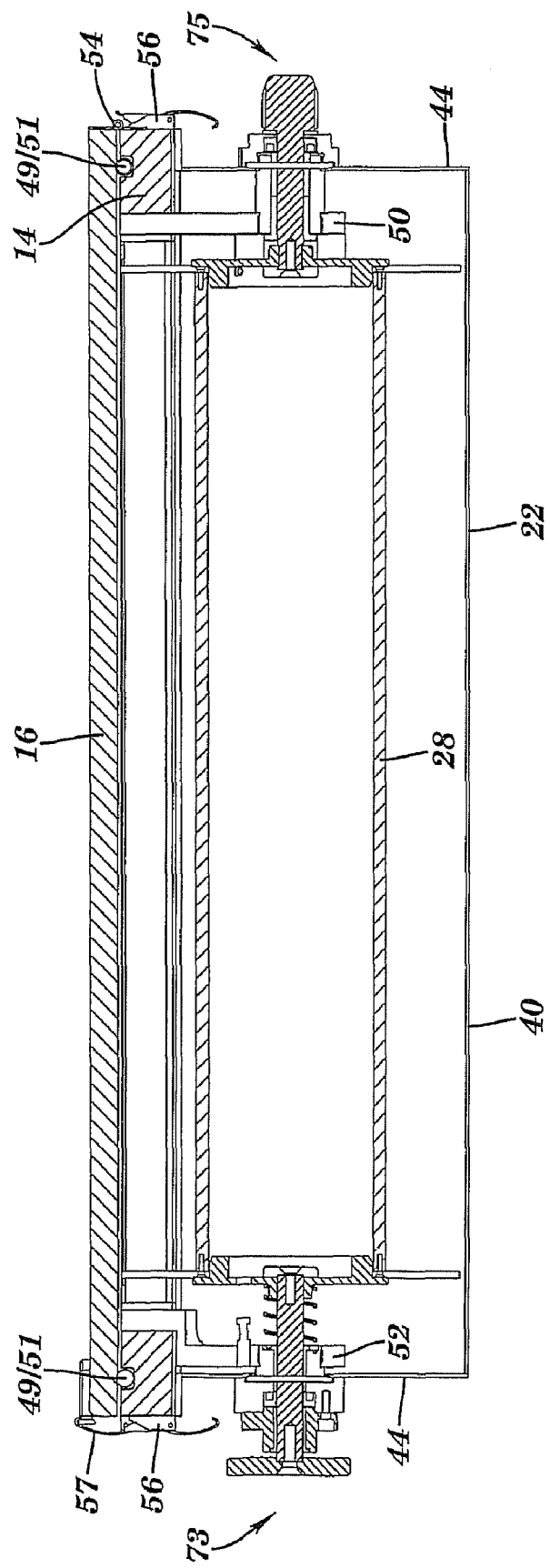
FIG. 7 a cross-sectional view of the cartridge shown in FIG. 3 through the take-up roller as viewed along section lines 7-7 in FIG. 3.

FIG. 7 is a cross-sectional view through the take-up spool 28 of the cartridge assembly 10 shown in FIG. 3 as viewed along section lines 7-7 in FIG. 3. As shown in FIG. 7, take-up spool 28 is mounted to gussets 50 and 52 (which are mounted to base 14) by means of load handle assembly 73 and driven spline take-up assembly 75. Load handle assembly 73 may be similar to load handle assembly 72. A detailed description of take-up spool 28, which may be similar to feed spool 26, is shown and described with respect to FIGS. 12, 13, and 14. Details of driven spline take-up assembly 75 are provided in FIGS. 15 through 18; details of load handle assembly 73 are provided in FIGS. 19 through 22.

Figure 8:
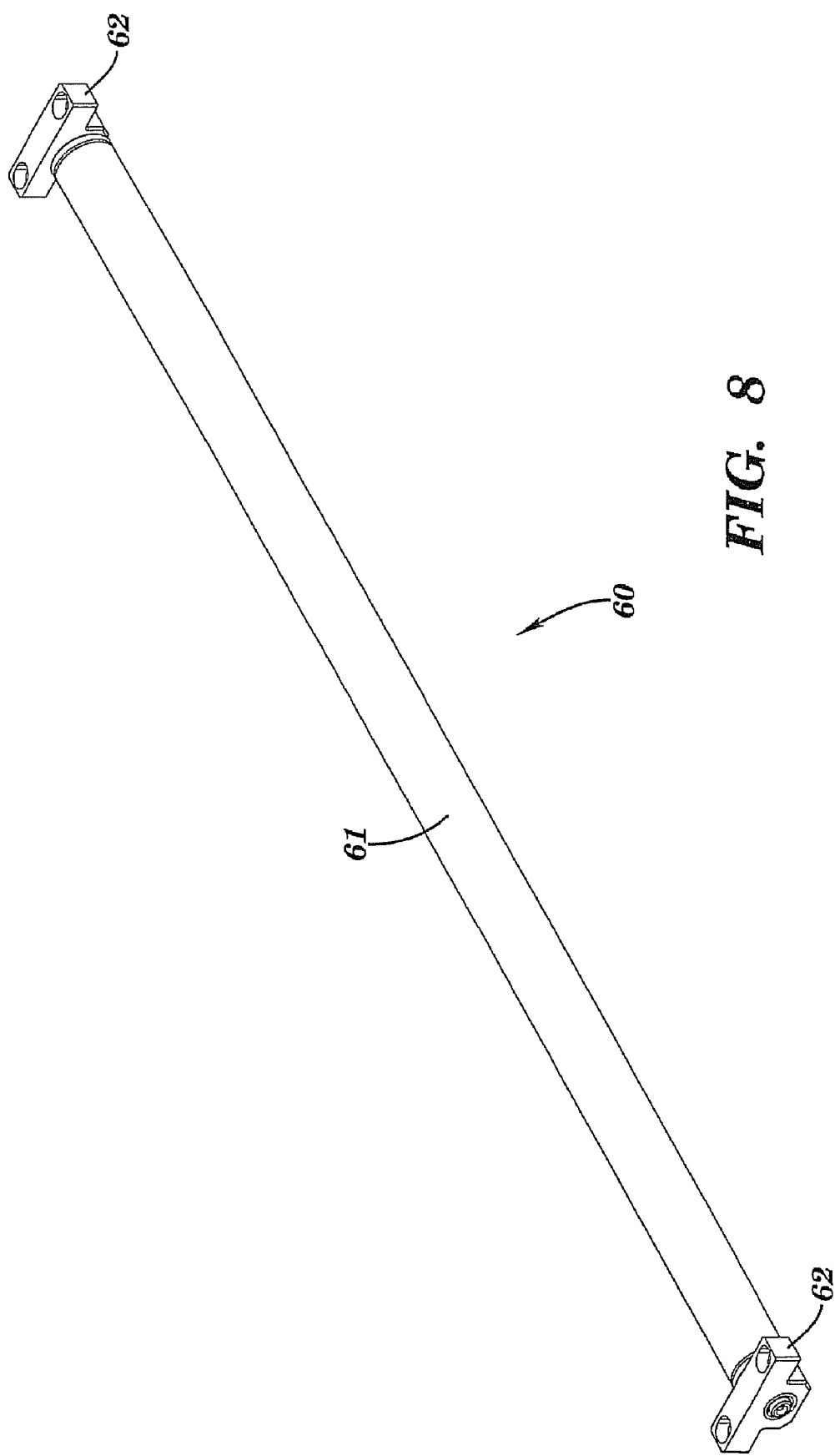
FIG. 8 is a perspective view of the guide roller assembly shown in FIGS. 1 and 2 according to one aspect of the invention.
Figure 9:
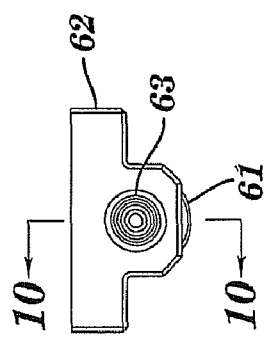
FIG. 9 is a side elevation view of the guide roller assembly shown in FIG. 8.
Figure 10:
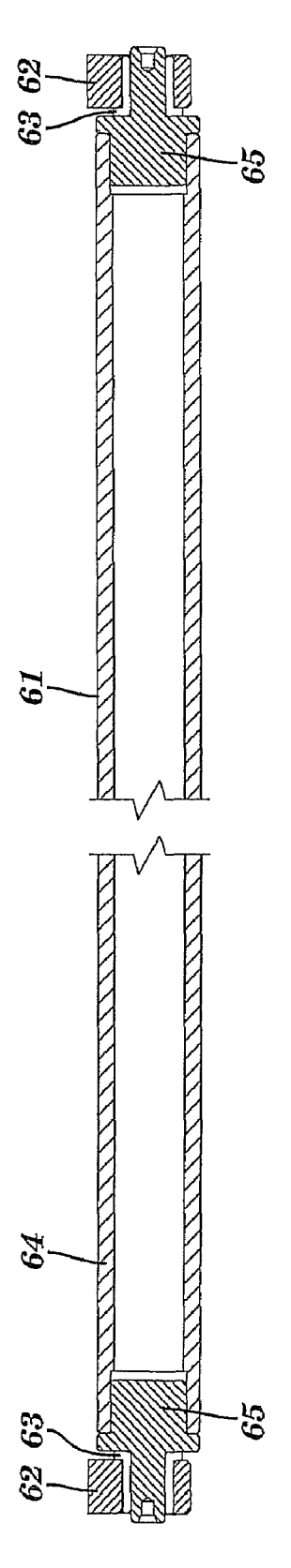
FIG. 10 is a cross-sectional view of the guide roller assembly shown in FIG. 9 as viewed along lines 10-10 in FIG. 9.

As shown in FIGS. 2 and 4, base 14 may also include one or more guide roller assemblies 60. Guide roller assemblies 60 may be mounted adjacent to cavities 18 and 22 and facilitate the transition of membrane 12 on backing 14 from spool 26 and onto spool 28. FIG. 8 is a perspective view of the guide roller assembly 60 shown in FIGS. 2 and 3 according to one aspect of the invention. FIG. 9 is a side elevation view of the guide roller assembly 60 shown in FIG. 8, and FIG. 10 is a cross-sectional view of guide roller assembly 60 shown in FIG. 9 as viewed along lines 10-10 in FIG. 9. Guide roller assemblies 60 may be mounted to base 14 by conventional means, for example, by means of mechanical fasteners. As shown in FIGS. 8 through 10, guide roller assembly 60 includes a roller 61 that is rotatably mounted to a roller bearing mount 62. For example, in one aspect of the invention, as shown in FIGS. 9 and 10, roller 61 may be mounted to bearing mount 62 by means of bearings 63. According to this aspect of the invention, bearings 63 may be journal bearings, for example, journal bearings made from a material having low coefficient of friction and resistance to corrosion, for example, tetra-flouro-ethylene (TFE) fluorocarbon material, for instance, a Rulon®-based plastic, for example, Rulon 641 TFE fluorocarbon provided by Boston Gear, or its equivalent. In one aspect of the invention, bearings 63 may be ball bearings, roller bearings, or needle bearings, among other types of bearings. According to one aspect of the invention, bearing mounts 62 may be metallic or non-metallic, for example, made from one or more of the metals or plastics discussed above with respect to base 14 and cover 16.

In one aspect of the invention, roller 61 may be a machined shaft. As shown in FIG. 10, rollers 61 may also be fabricated from piece parts. In the aspect shown in FIG. 10, roller 61 is fabricated from a hollow tube 64 and hubs 65. According to one aspect of the invention, tube 64 and hubs 65 may be metallic or non-metallic, for example, made from one or more of the metals or plastics discussed above with respect to base 14. In one aspect of the invention, tube 64 and hubs 65 are made from AISI 316 stainless steel. Hubs 65 are adapted to be mounted to tube 64 by conventional means, for example, by means of mechanical fasteners, welding, interference fit, shrink fit, screw threads, or adhesives, among other methods. As noted above, in one aspect of the invention, tube 64 and hubs 65 may be fabricated as a single integral part, for example, machined from a metallic or plastic rod. In one aspect of the invention, roller 61 may have a diameter of between about 0.125 inches and about 6 inches, and typically has a diameter of between about 0.5 inches and about 1 inch. In one aspect of the invention, roller 61 may have a length of between about 6 inches and about 6 feet, and typically has a length of between about 12 inches and 24 inches.

Figure 11:
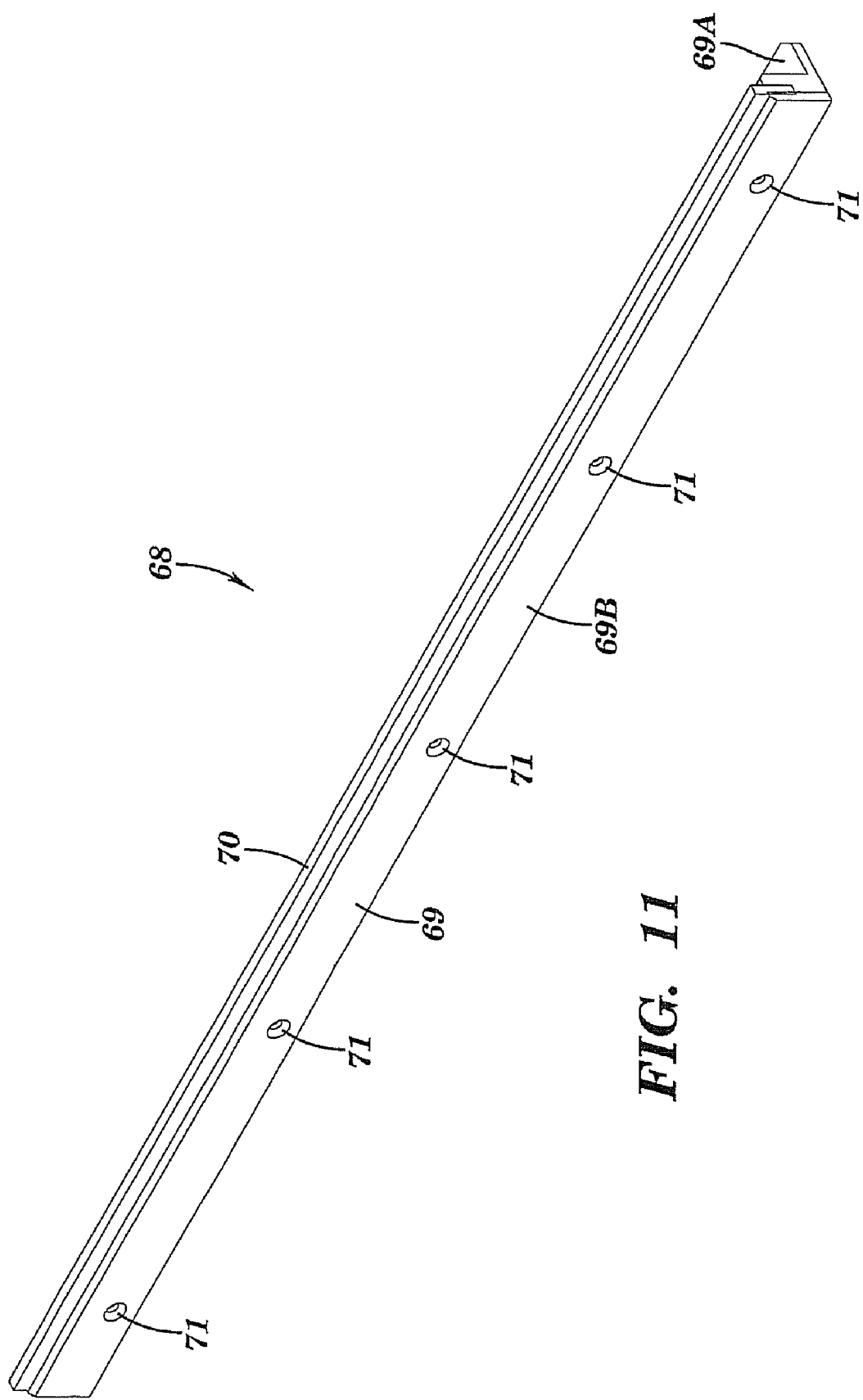
FIG. 11 is a perspective view of the wiper assembly shown in FIGS. 2 and 4 according to one aspect of the invention.

As shown in FIGS. 2 and 4, in one aspect of the invention, base 14 may also include a wiper assembly 68, for example, an elastomeric wiper, for removing excess solution from backing 13 as the membrane is removed from cavity 18, for example, from feed spool 26. FIG. 11 is a perspective view of the wiper assembly 68 shown in FIGS. 2 and 4 according to one aspect of the invention. As shown in FIG. 4, wiper assembly 68 may be located over cavity 18 whereby any solution removed from membrane assembly 15 by wiper assembly 68 may be returned to cavity 18. As shown in FIG. 11, wiper assembly 68 includes a wiper retainer 69 and a wiper blade 70. Wiper retainer 69 may comprise a two-piece retainer comprising a bracket 69A and a strip 69B. Like many of the components discussed in this specification, bracket 69A and strip 69B may be specially designed and fabricated parts, for example, parts designed by Progressive Machine & Design (PMD) of Victor, N.Y. Bracket 69A and strip 69B are adapted to retain wiper blade 70. For example, as shown in FIG. 11, wiper blade 70 may be captured between bracket 69A and strip 69B by means of threaded fasteners inserted into holes 71. Bracket 69A and strip 69B may also be adapted to mount wiper assembly 68 to base 14, for example, removably mounted to base 14, for instance, wiper assembly 68 may be removably mounted to base 14 by means of conventional mechanical fasteners. In one aspect, wiper retainer 69 is preferably made from a corrosion-resistant material, for example, acid or caustic-resistant material, for instance, a corrosion-resistance plastic or corrosion-resistant metal. In one aspect of the invention, wiper blade 70 may be plastic or elastomeric, for example, wiper blade 70 may be made from a fluoroelatomer, such as, Dupont's Viton® fluoroelastomer, or its equivalent.

FIG. 12 is a front elevation view of a spool 26 that may be used for feed spool 26 and take-up spool 28 shown in FIGS. 2, 5, and 7, according to one aspect of the invention. FIG. 13 is a side elevation view of spool 26 shown in FIG. 12 and FIG. 14 is a cross-sectional view of spool 26 shown in FIG. 13 as viewed along lines 14-14 in FIG. 13. According to one aspect of the invention, spools 26 and 28 may be identical, for example, have identical construction. In one aspect, spools 26 and 28 may have different constructions. Though many different types of spool constructions may be used, as shown in FIGS. 12, 13, and 14, according to one aspect of the invention, spool 26 may comprise a hollow cylinder 74 having spool end plates 76 and 78 which retain membrane assembly 15 (see FIG. 2). End plates 76 and 78 may be mounted to cylinder 74 by conventional means, for example, by means of mechanical fasteners, welding, or an adhesive. As shown in FIGS. 12, 13, and 14, endplates 76 and 78 may be mounted to cylinder 74 by threaded fasteners 79. Cylinder 74 and endplates 76 and 78 may be metallic or non-metallic, for example, they may be made from one or more of the metals or plastics described above with respect to base 14 and cover 16. According to one aspect of the invention cylinder 74 may be made from PVC plastic and end plates 76 and 78 may be made from AISI 316 stainless steel. According to one aspect of the invention, cylinder 74 may be between about 0.5 inches and about 12 inches in outside diameter and between about 3 inches and about 20 feet in length. In one aspect of the invention, cylinder 74 may be about 3 inches in outside diameter and about 16 inches in length. According to one aspect of the invention, endplates 76 and 78 may be between about 1 inch and about 36 inches in outside diameter and between about 0.625 inches and about 2 inches in thickness. In one aspect of the invention, endplates 76 and 78 may be about 6 inches in outside diameter and about 0.125 inches in thickness.

According to this aspect of the invention endplates 76 and 78 include some means for mounting to base 14, for example, some means for rotatably mounting to base 14. In the aspect of the inventions shown in FIGS. 12, 13, and 14, endplates 76 and 78 include an aperture or through hole 77 and at least one, preferably at least two, recesses 81 positioned in the inside diameter of aperture 77. According to this aspect of the invention, aperture 77 and recesses 81 are adapted to engage the load handle assemblies 71 and 73 (shown in FIGS. 1 through 5, 7, and 19 through 22); the payout tensioner assembly 70 (shown in FIGS. 1, 2, 4, 5, and 23 through 26); and the driven spline take-up assembly 75 (shown in FIGS. 1, 2, 4, 5, 7, and 15 through 18). The details of this engage of spools 26 and 28 will be discussed below. In one aspect of the invention, the inside diameter of cylinder 74 is greater than the inside diameter of aperture 77 to avoid interference with the respective mounting assemblies.

FIG. 15 is perspective view of the driven spline take-up assembly 75 shown in FIGS. 5 and 7 according to another aspect of the invention. FIG. 16 is a side elevation view of the driven spline take-up assembly 75 shown in FIG. 15. FIG. 17 is a front elevation view of the driven spline take-up assembly 75 shown in FIG. 15. FIG. 18 is a cross sectional view of the driven spline take-up assembly 75 shown in FIGS. 15 though 17 as viewed along lines 18-18 in FIG. 17. According to this aspect of the invention, assembly 75 provides a means for mounting take-up spool 28 to mounting gusset 50 (see FIG. 7) and also provides a means for advancing the membrane assembly 15 across cartridge 10. Assembly 75 may also provide a seal between the interior of cavity 22 (as indicated by end panel 44 shown in phantom in FIG. 18) and the exterior of cartridge 10.

As shown in FIGS. 15 through 18, assembly 75 includes a spool-mounting disk 82 which is adapted to engage take-up spool 28, for example, spool 28 shown in FIGS. 12, 13, and 14. In the aspect shown in FIGS. 15 through 18, spool-mounting disk 82 includes a hub 83, a flange 84, and at least one pin 85 mounted in the periphery of hub 83. According to this aspect of the invention, mounting disk 82 is adapted to engage spool 28 whereby hub 83 can be inserted into aperture 77 of spool 28 (see FIG. 13) whereby flange 84 bears against the surface of endplate 76 (or 78) and the at least one pin 85 engages at least one of the recesses 81 in the inner diameter of aperture 77. As a result, any load, for example, any torsional load, placed on assembly 75 is transmitted to spool 28 to rotate spool 28 and advance the membrane assembly 15 mounted on spool 28.

According to this aspect of the invention, spool-mounting disk 82 is operationally connected to a means for rotating spool mounting disk 82 and thus rotating spool 28. In the aspect shown in FIGS. 15 through 18, spool-mounting disk 82 is mounted to a shaft 86 that is adapted to be driven by an external source of rotational motion (not shown), for example, a motor. As shown, though shaft 86 may include various conventional means for transferring torsional motion from an external source, including one or more gears, in the aspect of the invention shown, shaft 86 includes a proximal end having a spline 87. Spline 87 may comprise any conventional spline design appropriate for the expected loading. In one aspect of the invention, spline 87 comprises a spline machined from a spline bar provided by Grob Inc. of Grafton, Wis., for example, a Grob spline bar having a part number 0950-20-2, or its equivalent. In one aspect of the invention, spline 87 and shaft 86 are designed to transmit at least 16 foot-pounds to shaft 86. Shaft 86 may be mounted, to disk 82 by conventional means, for example, by means of mechanical fasteners. In the aspect shown in FIG. 15 through 18, disk 82 is mounted to shaft 86 by means of disk mounting plate 88 and screw 89, for example, a counter-sunk screw.

Miscellaneous other hardware may be provided as appropriate to support shaft 86 and disk 82 and to provide uniform operation and minimize leakage. For example, in the aspect shown in FIGS. 15 through 18, shaft 86 is mounted to gusset 50 by means of mounting bushing 90 mounted to gusset 50. Mounting bushing 90 may be designed by PMD. In addition, shaft 86 may be supported by one or more bearings, for example, bearings 91 and 92 mounted within bushing 90. In one aspect of the invention, bearings 91 and 92 may have a low coefficient of friction and resistance to corrosion, for example, they may be made from a plastic material. Specifically, in one aspect, bearing 91 may comprise a Rulon-641 flanged bearing provided by McMaster-Carr having a part number 7560K19; and bearing 92 may comprise a Rulon-641 sleeve bearing, also provided by McMaster-Carr, having a part number 7737K19, or their equivalents.

Assembly 75 may also include a spacer ring 93 mounted to gusset 50. Spacer ring 93 may be made from one or more of the materials referenced above with respect to base 14 and cover 16. In one aspect of the invention, spacer ring 93 may be made from PTFE-containing material, for example, Dupont Teflon® PTFE, or its equivalent.

As also shown in FIG. 18, bushing 90 may typically pass through the sidewall 44 (shown in phantom) of cavity 22. In order to prevent or minimize leakage of fluids, assembly 75 may also include a seal 94. In one aspect of the invention, seal 94 may be an oil seal provided by AFM Incorporated of Tigard, Oreg., having a part number MOS 12-24-7 SC SS, or its equivalent. In addition, assembly 75 may also include a seal housing 95, for example, a seal housing also provided by PMD. Seal housing 95 may be threaded to bushing 90. In addition, assembly 75 may also include an o-ring seal 96 mounted between seal housing 95 and cavity endplate 44 (shown in phantom). O-ring seal 96 may a Viton o-ring provided by McMaster-Carr having a part number 9464K91, or its equivalent. O-ring seal 96 may typically be compressed between seal housing 95 and endplate 44 as seal housing 95 is threaded onto bushing 90. Assembly 75 may also include a thrust bearing 97 mounted between spline 87 and seal housing 95, for example, a Rulon-LR thrust bearing provided by McMaster-Carr having a part number 7532K13, or its equivalent.

According to one aspect of the invention, disk 82, shaft 86, spacer ring 93, seal housing 95, and bushing 90 may be made of one or more of the materials referenced above with respect to base 14 and cover 16. However, in one aspect of the invention, disk 82 may made from AISI 316 stainless steel; shaft 86 may be made from AISI 316 stainless steel or a surface-hardened mild steel, for example, an Armalite-plated mild steel; spacer ring 93 may be made from a PTFE-containing material, for example, Dupont Teflon® PTFE, or its equivalent; seal housing 95 mat be made from AISI 316 stainless steel; and bushing 90 may be made from AISI 316 stainless steel. Again, one or more of these parts may be specially designed by PMD.

Figure 19:
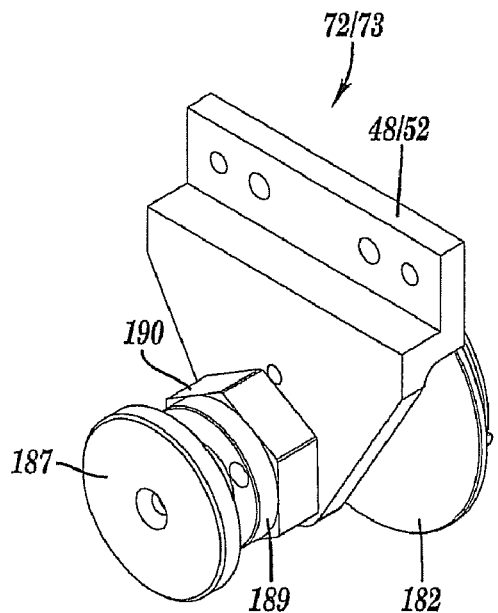
FIG. 19 is perspective view of the load handle assembly for both spools shown in FIGS. 1 through 5, and 7 according to another aspect of the invention.
Figure 20:
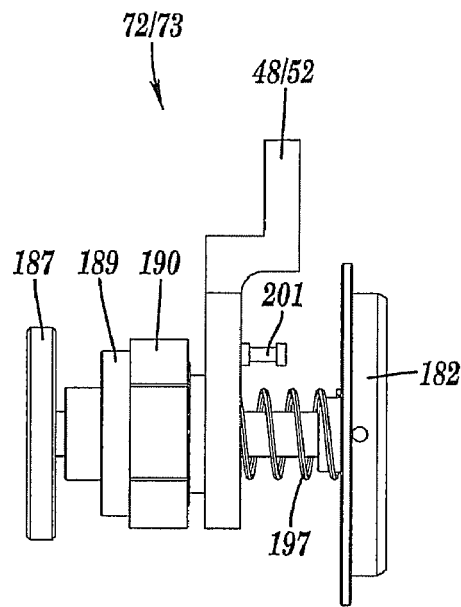
FIG. 20 is a side elevation view of the load handle assembly shown in FIG. 19.
Figure 21:
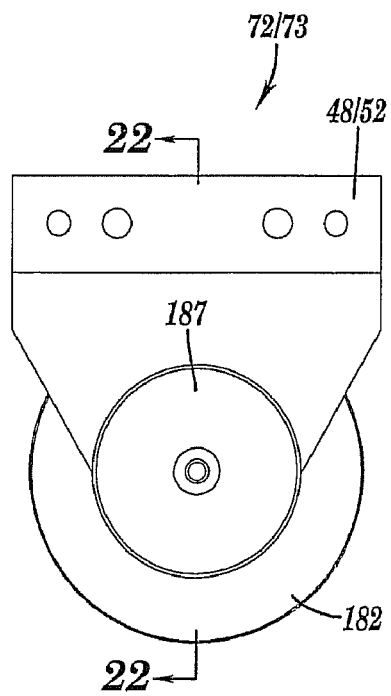
FIG. 21 is a front elevation view of the load handle assembly shown in FIG. 19.
Figure 22:
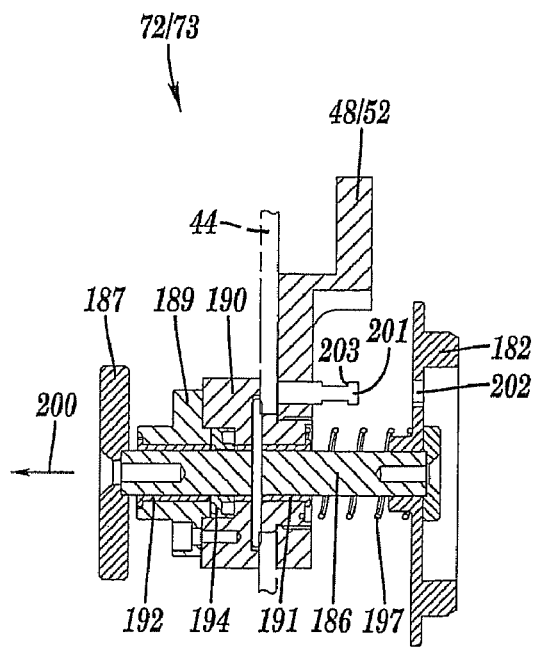
FIG. 22 is a cross sectional view of the load handle assembly shown in FIGS. 19 though 21 as viewed along lines 22-22 in FIG. 21.

FIG. 19 is a perspective view of the load handle assembly 72, 73 for both spools shown in FIGS. 1 through 5, and 7 according to another aspect of the invention. FIG. 20 is a side elevation view of the load handle assembly 72, 73 shown in FIG. 19. FIG. 21 is a front elevation view of the load handle assembly 72, 73 shown in FIG. 19 and FIG. 22 is a cross sectional view of the load handle assembly 72, 73 shown in FIGS. 19 though 21 as viewed along lines 22-22 in FIG. 21. Though the following discussion applies to both assembly 72 and assembly 73, reference to only assembly 72 will be made to facilitate the discussion. According to this aspect of the invention, assembly 72 provides a means for mounting feed spool 26 and take-up spool 28 to base 14 and also provides a means for adjusting the location of membrane assembly 15 in cartridge assembly 10, for example, manually adjusting the position of membrane assembly 15 in cartridge assembly 10. In addition, according to another aspect of the invention, assembly 72 also includes means to disengage spools 26 and 28 so that spools 26 and 28 may be removed from cartridge assembly 10 as needed for replacement or servicing. Moreover, assembly 72 also provides a seal between the interior of cavities 18 and 22 (as indicated by end panel 44 shown in phantom in FIG. 22) and the exterior of cartridge assembly 10.

As shown in FIGS. 19 through 22, assembly 72 includes a spool-mounting disk 182 which is adapted to engage spools 26 and 28, for example, spool 26 shown in FIGS. 12, 13, and 14. Spool mounting disk 182 may be substantially identical to spool-mounting disk 82 shown and described with respect to the aspect of the invention shown in FIGS. 15 through 18. Specifically, spool-mounting disk 182 includes a hub 83, a flange 84, and at least one pin 85 mounted in the periphery of hub 83 in a fashion similar to mounting disk 82. Also, spool-mounting disk 182 is adapted to engage spools 26 and 28 in substantially the same way that spool-mounting disk 82 engages spool 28, for example, via aperture 77 of spool 28 (see FIG. 13), whereby spool mounting disk 182 may transmit a torsional load to spools 26 and 28 to rotate spools 26 and 28 to position membrane assembly 15 on cartridge assembly 10.

According to this aspect of the invention, spool-mounting disk 182 is operationally connected to a means for rotating spool mounting disk 182 and thus rotating spools 26 and 28. In the aspect shown in FIGS. 19 through 22, spool-mounting disk 182 is mounted to a shaft 186 that is adapted to be rotated by an external source of rotational motion (not shown), for example, manually by a human attendant, automatedly by a robotic arm, or by a motor. As shown, though shaft 186 may include various conventional means for transferring torsional motion from an external source, including one or more gears, in the aspect of the invention shown, shaft 186 includes a proximal end having a handle 187. Handle 187 may comprise any conventional handle adapted to be manually or automatedly rotated; however, in one aspect, handle 187 may comprise a disk having a knurled periphery to facilitate manual rotation of handle 187. In one aspect of the invention, handle 187 and shaft 186 are designed to transmit at least 16 foot-pounds to shaft 186. Shaft 186 may be mounted to disk 182 in a manner similar to disk 82 and shaft 86, for example, by means of disk mounting plate 88 and screw 89 (see FIG. 18).

Miscellaneous other hardware may be provided as appropriate to support shaft 186 and disk 182 and to provide uniform operation and minimize leakage. For example, in the aspect shown in FIGS. 19 through 22, shaft 186 may be mounted to gussets 48, 52 by means of seal housing 190 mounted to gusset 48, 52 and bearing housing 189 mounted to seal housing 190, for example, mounted by threaded fasteners. Seal housing 190, bearing housing 189, and other hardware may be specially designed and provided by PMD. In addition, shaft 186 may be supported by one or more bearings, for example, bearings 191 and 192 mounted within seal housing 190 and bearing housing 189. In one aspect of the invention, bearings 191 and 192 may have a low coefficient of friction and resistance to corrosion, for example, plastic bearings. Specifically bearings 191 and 192 may comprise a Rulon-641 flanged bearing provided by McMaster-Carr having a part number 7560K13, or its equivalent.

As also shown in FIG. 22, seal housing 190 may typically pass through the sidewall 44 (shown in phantom) of cavity 18 or 22. In order to prevent or minimize leakage of fluids, assembly 72 may also include a seal 194. In one aspect of the invention, seal 194 may be an oil seal provided by AFM Incorporated of Tigard, Oreg., having a part number MOS 12-24-7 SC SS, or its equivalent. In addition, assembly 72 may also include an o-ring seal 196 mounted between seal housing 190 and cavity endplate 44 (shown in phantom). O-ring seal 196 may a Viton o-ring provided by McMaster-Carr having a part number 9464K91, or its equivalent.

In one aspect of the invention, assembly 72 may be spring loaded to permit deflection of spool-mounting disk 182 so that spool-mounting disk 182 may disengage spool 26 or 28 whereby spools 26 and 28 may be removed, for example, for replacement or servicing. According to this aspect of the invention, assembly 72 also includes a spring 197, for example, a coil spring, mounted between spool mounting disk 182 and seal housing 190. In one aspect of the invention, seal hosing 190 may include a recess to aid in positioning or capturing spring 197. According to this aspect of the invention, handle 187 may be used to translate shaft 186 and spool-mounting disk 182 in the direction of arrow 200 whereby disk 182 disengages spool 26 or 28 (not shown). When not deflected, spring 197 biases the position of disk 182 against spool 26 or 28 to ensure engagement between disk 182 and spool 26 or 28. In one aspect of the invention, spring 197 may be a coil spring provided by Lee Spring Company of Brooklyn, N.Y. having a part number LC-063L-5-S, or its equivalent.

According to another aspect of the invention, load handle assembly 72 may also include means for retaining spool-mounting disk 182 in the deflected position, for example, to assist the operator in removing or mounting spool 26 or 28 onto load handle assembly 72. According to one aspect of this invention, assembly 72 includes at lest one pin 201 mounted in gusset 48 or 52, for example, press fit or welded to gusset 48 or 52. In addition, disk 182 may also include at least one aperture or through hole 202 adapted to engage pin 201. For example, in one aspect of the invention, the diameter of through hole 202 on disk 182 may be larger than the maximum diameter of pin 201, and pin 201 may include at least one shoulder or recess 203 having an external dimension less than the maximum diameter of pin 201. According to this aspect of the invention, when disk 182 is compressed against spring 197, pin 201 may be inserted into through hole 202 whereby pin 201 may penetrate through hole 202 and an edge of the shoulder 203 on pin 201 may engage a keyhole of hole 202 whereby disk 182 is retained in the deflected position. With disk 182 retained, the operator may replace or mount a spool 26 or 28 and then, for example, when mounted, the operator may disengage hole 202 from pin 201 whereby disk 182 may engage spool 26 or 28.

According to one aspect of the invention, disk 182, shaft 186, handle 187, bearing housing 189 and seal housing 190 may be made of one or more of the materials referenced above with respect to base 14 and cover 16. However, in one aspect of the invention, disk 182, shaft 186, handle 187, bearing housing 189, and seal housing 190 may be made from AISI 316 stainless steel. Again, one or more of these parts may be designed by PMD.

Figure 23:
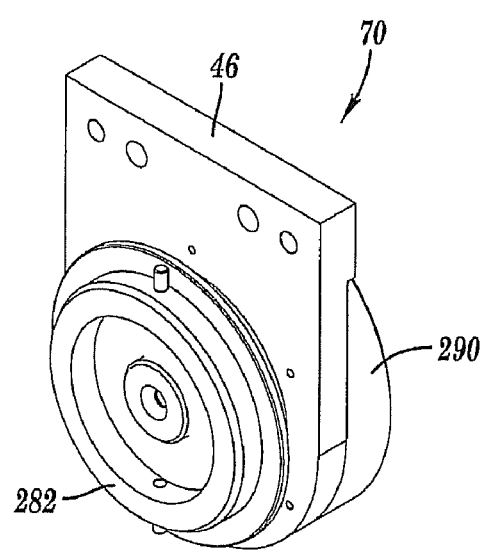
FIG. 23 is perspective view of the payout tensioner assembly shown in FIGS. 1, 2, 4, and 5 according to another aspect of the invention.
Figure 24:
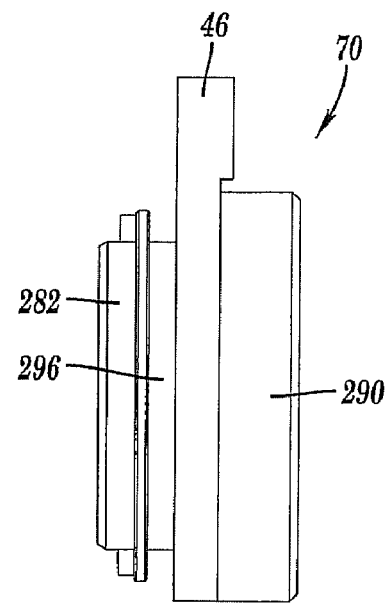
FIG. 24 is a side elevation view of the payout tensioner assembly shown in FIG. 23.
Figure 25:
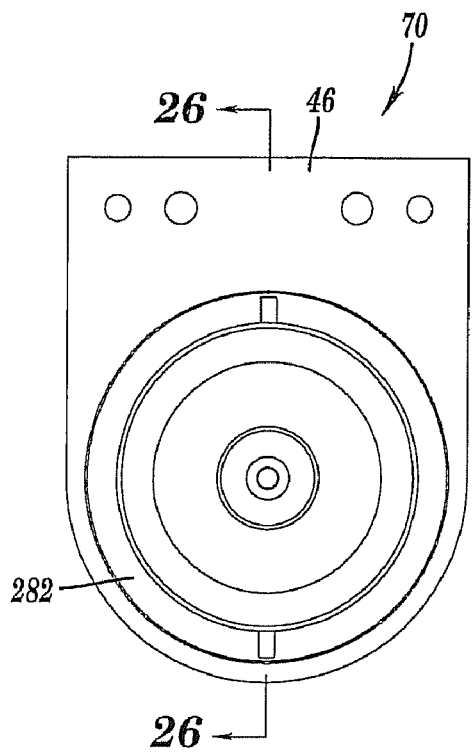
FIG. 25 is a front elevation view of the payout tensioner assembly shown in FIG. 23.
Figure 26:
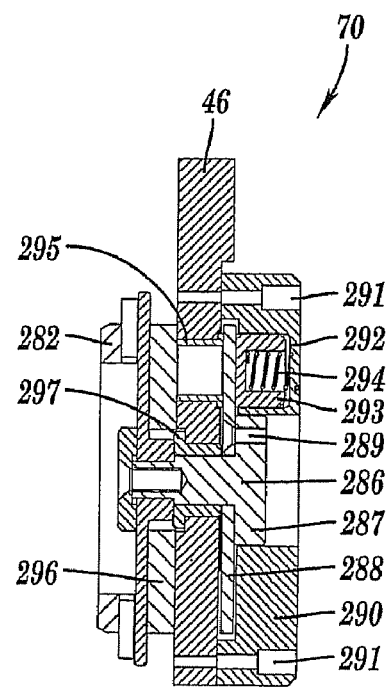
FIG. 26 is a cross sectional view of the payout tensioner assembly shown in FIGS. 23 though 25 as viewed along lines 26-26 in FIG. 25.

FIG. 23 is a perspective view of the payout tensioner assembly 70 shown in FIGS. 1, 2, 4, and 5 according to another aspect of the invention. FIG. 24 is a side elevation view of the payout tensioner assembly 70 shown in FIG. 23. FIG. 25 is a front elevation view of the payout tensioner assembly 70 shown in FIG. 23. FIG. 26 is a cross sectional view of the payout tensioner assembly 70 shown in FIGS. 23 though 25 as viewed along lines 26-26 in FIG. 25. According to this aspect of the invention, payout tensioner assembly 70 provides a means for mounting payout spool 26 to base 14 and also provides a means for adjusting the tension in the membrane assembly 15 mounted in cartridge assembly 10.

As shown in FIGS. 23 through 26, assembly 70 includes a spool-mounting disk 282 which is adapted to engage spool 26, for example, spool 26 shown in FIGS. 12, 13, and 14. Spool mounting disk 282 may be substantially identical to spool-mounting disks 82 and 182 shown and described with respect to the aspect of the invention shown in FIGS. 15 through 18 and FIGS. 19 through 22, respectively. Specifically, spool-mounting disk 282 includes a hub 83, a flange 84, and at least one pin 85 mounted in the periphery of hub 83 in a fashion similar to mounting disks 82 and 182. Also, spool-mounting disk 282 is adapted to engage spool 26 in substantially the same way that spool-mounting disks 82 and 182 engage spools 26 and 28, for example, via aperture 77 of spool 28 (see FIG. 13), whereby spool mounting disk 282 may transmit a torsional load to spool 26 to limit the rotation of spool 26 and thus adjust the tension in membrane assembly 15 on cartridge assembly 10.

According to this aspect of the invention, spool-mounting disk 282 is operationally connected to a means for limiting the rotation spool-mounting disk 282 and thus limiting the rotation of spool 26. In the aspect shown in FIGS. 23 through 26, spool-mounting disk 282 is mounted to a shaft 286 that engages a means for limiting the rotation of shaft 286. As shown, though shaft 286 may include various conventional means for limiting its rotation, in the aspect of the invention shown, shaft 286 includes a proximal end opposite disk 282 having a hub 287. According to this aspect, a disk 288 is mounted to hub 287 of shaft 286, for example, mounted by conventional means, for example, in the aspect shown, disk 288 may be mounted to hub 287 by one or more threaded fasteners 289. Though not shown, disk 288 may also be keyed to hub 287 by means of one or more fixed or removable keys, that is, by one or more corresponding protrusions and recesses positioned in hub 287 or disk 288, or both.

Miscellaneous other hardware may be provided in assembly 70 as appropriate to support shaft 286 and disk 282 and to provide uniform operation. For example, in the aspect shown in FIGS. 23 through 26, shaft 286 may be mounted to gusset 46 by means of bearing 297 mounted to gusset 46. In one aspect of the invention, bearing 297 may have a low coefficient of friction and resistance to corrosion, for example, a plastic bearing. Specifically, bearing 97 may comprise a Rulon-641 flanged bearing provided by McMaster-Carr having a part number 7560K11, or its equivalent.

According to this aspect of the invention, assembly 70 may include a piston housing 290 mounted to gusset 46, for example, mounted by means of a plurality of threaded fasteners 291. According to this aspect of the invention, piston housing 290 may include at least one recess 292, typically a plurality of circular recesses 292, for holding at least one piston 293 and at least one spring 294. In one aspect of the invention, at least three pistons 293 and springs 294 are provided. Piston 293 may simply be a cup-type device adapted to mount and translate in recess 292. Spring 294 may be a coil spring, for example, a coil spring sold by Lee Spring Company having the part number LC-035E-6-S, or its equivalent. According to this aspect of the invention, spring 294 compresses piston 293 against the surface of disk 288 to provide at least some friction between piston 293 and disk 288 to provide at least some retarding of the rotation of disk 288. In other words, in this aspect of the invention, payout tensioner assembly 70 provides a disk-brake-like apparatus for limiting the rotation of disk 288, and thus limiting the rotation of shaft 286, disk 282, and the associated spool 26. As a result, according to one aspect of the invention, payout tensioner assembly 70 allows the operator to maintain or control the tension of the membrane assembly 15 dispensed from spool 26.

In addition, according to this aspect, assembly 70 may also include at least one reaction member 295 mounted in gusset 46 to oppose the normal force applied by spring 294 and, if desired, provide one or more additional friction-inducing surfaces on disk 288. In the aspect shown in FIG. 26, one or more reaction members 295 may be mounted in through holes in gusset 46. In this aspect, a retaining plate 296 may also be provided to retain reaction members in gusset 46.

According to one aspect of the invention, the compression of spring 294 against disk 288 provides sufficient frictional resistance to the rotation of disk 282 to provide sufficient tension to the membrane assembly 15 mounted in cartridge assembly 10. In one aspect, the desired tension in membrane assembly 15 may be regulated by replacing coil spring 294 with a spring having a higher or lower stiffness. According to another aspect of the invention, the tension in membrane assembly 15 may also be regulated by adjusting the compression applied by spring 294. For example, in one aspect, compression provided by spring 294 may be varied by means of an adjustment screw mounted in housing 290 adapted to vary the compression of spring 294. In another aspect of the invention, the normal force applied by piston 293 may be replaced or supplemented by a pneumatic or hydraulic pressure, for example, applied behind piston 293.

According to one aspect of the invention, disk 282, shaft 286, plate 288, housing 290, piston 293, plate 296, and reaction member 295 may be made of one or more of the materials referenced above with respect to base 14 and cover 16. However, in one aspect of the invention, disk 282 may be made from AISI 316 stainless steel; shaft 286 may be made from AISI 316 stainless steel; plate 288 may be made from stainless steel, for example, AISI 304; housing 290 may be made from PVC plastic; piston 293 may be made from a PTFE-containing material, such as, Dupont Teflon® PTFE or Saint-Gobain Rulon® PTFE, or their equivalents; plate 296 may be made from PVC plastic; and reaction member 295 may comprise a material having a low coefficient of friction and resistance to corrosion, for example, a plastic material. In one aspect, reaction member 295 may comprise a Rulon-641 flanged bearing provided by McMaster-Carr having a part number 7560K18, or its equivalent.

Figure 27:
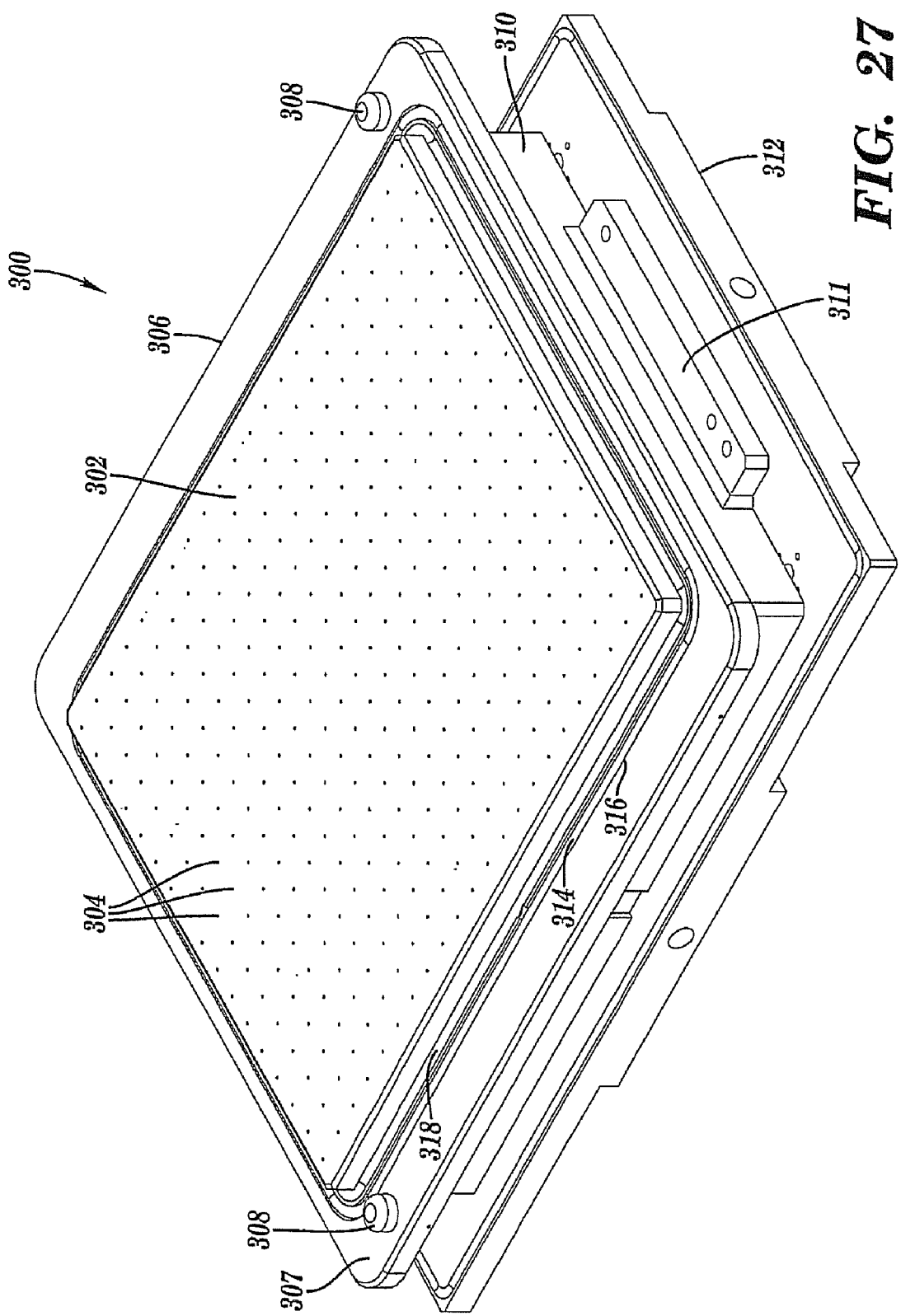
FIG. 27 is perspective view of the vacuum table assembly according to another aspect of the invention.

FIG. 27 is perspective view of a vacuum table assembly 300 which may be used with cartridge assembly 10 shown FIGS. 1 and 2 according to another aspect of the invention. FIG. 28 is a front elevation view of the vacuum table assembly 300 shown in FIG. 27, and FIG. 29 is a side elevation view, showing internal passages in phantom, of the vacuum table assembly 300 shown in FIG. 27. According to one aspect of the present invention, cartridge assembly 10 is adapted to mount to vacuum table 10 whereby membrane assembly 15 may be retained by vacuum table assembly 300 and processed or manipulated as desired. For example, in one aspect, when cartridge assembly 10 is mounted on vacuum table 300, membrane assembly 15 may be cut to size, for example, die cut to size and then the cut pieces removed for further handling or processing. According to other aspects of the invention, the membrane assembly 15 may be laser cut or water jet cut, among other cutting methods.

Vacuum table assembly 300 includes a vacuum surface 302 having a plurality of perforations or holes 304. Holes 304 may have a diameter of between about 0.001 inches and about 0.50 inches and be uniformly or non-uniformly spaced about vacuum surface 302. As is typical, holes 304 are in fluid communication with a source of vacuum (not shown) that may be used to draw and retain a thin film, such as, membrane assembly 15. The source of vacuum may typically provide an under-pressure of about 1 psi to about 2.5 psi below the prevailing atmospheric pressure.

As shown in FIGS. 27 through 29, according to this aspect of the invention, vacuum surface 302 is elevated above a support plate 306. Support plate 306 is adapted to receive and support cartridge assembly 10 while membrane assembly 15 is being handled by vacuum table 300. Support plate 306 includes a support surface 307 and may include one or more positioning pins 308 which may correspond to one or more recesses in cartridge assembly 10 to provide a positive positioning of cartridge assembly 10 on vacuum table 300. Further to this aspect of the invention, vacuum surface 302 and support plate 306 may be mounted on a support structure 310 which in turn may be mounted on base plate 312. As shown in phantom in FIG. 29, support plate 306, support structure 310, and base plate 312 typically include a plurality of interconnected passages that provide the vacuum from the source of vacuum (not shown) to the holes 304 in vacuum surface 302 in a conventional manner. Support structure 310 may include one or more mounting flanges 311 by which support structure 310 may be mounted to base plate 310, for example, by means of threaded fasteners.

According to one aspect of the invention support surface 307 may also include a sealing element 314 and a channel 316 for retaining sealing element 314. Seal element 314 and channel 316 may typically encircle the entire vacuum surface 302. Sealing element 314 may be used to limit or prevent the leakage of liquids, for example, corrosive liquids, which may be present in cartridge assembly 10, for instance, the corrosive liquids used to condition membrane assembly 15. In one aspect of the invention, sealing element 314 comprises an elastomeric sealing element that is corrosion resistant. In one aspect of the invention, sealing element 314 may be a high-temperature Viton rubber tubing provided by McMaster-Carr having a part number 5119K33, or its equivalent.

In another aspect of the invention, support surface 306 may also include a trough 318 positioned between sealing element 314 and raised vacuum surface 302 to collect any fluids that may leak from cartridge assembly 10. Trough 318 may also encircle vacuum surface 302 and may include a collection drain (not shown) through which the fluids may pass for collection, treatment, or disposal.

According to one aspect of the invention, vacuum surface 302, support plate 306, pins 308, support structure 310, base plate 312 may be made of one or more of the materials referenced above with respect to base 14 and cover 16. However, in one aspect of the invention, vacuum surface 302, support plate 306, and pins 308 may be made from AISI 316 stainless steel; support structure 310 may be made from aluminum, for example, nickel-plated 6061 aluminum, or its equivalent; and base plate 312 may be made from AISI 316 stainless steel. Again, one or more of these parts may be designed by PMD.

Figure 30:
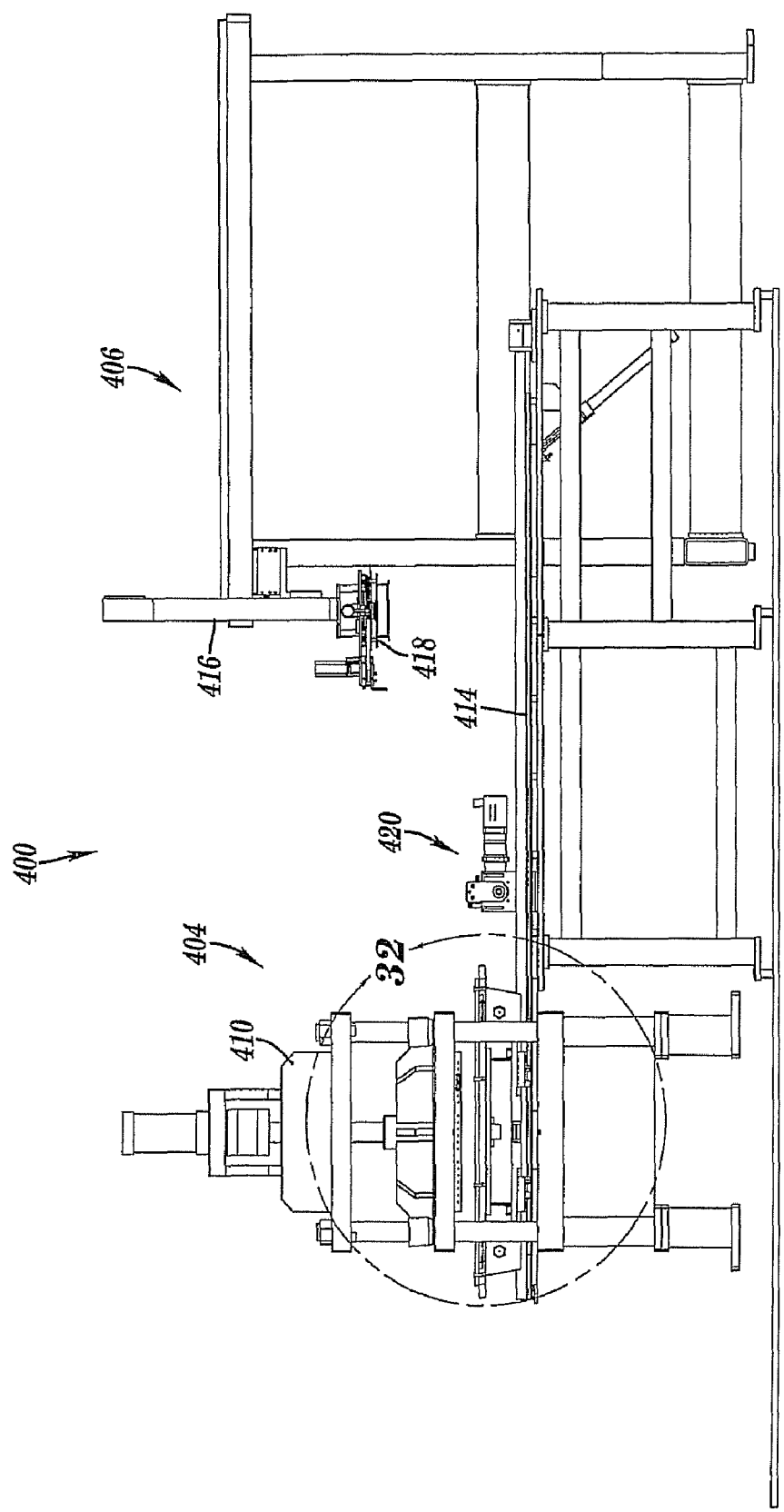
FIG. 30 is a front elevation view of an assembly system in which the cartridge assembly shown in FIGS. 1 and 2 may be used according to another aspect of the invention.
Figure 31:
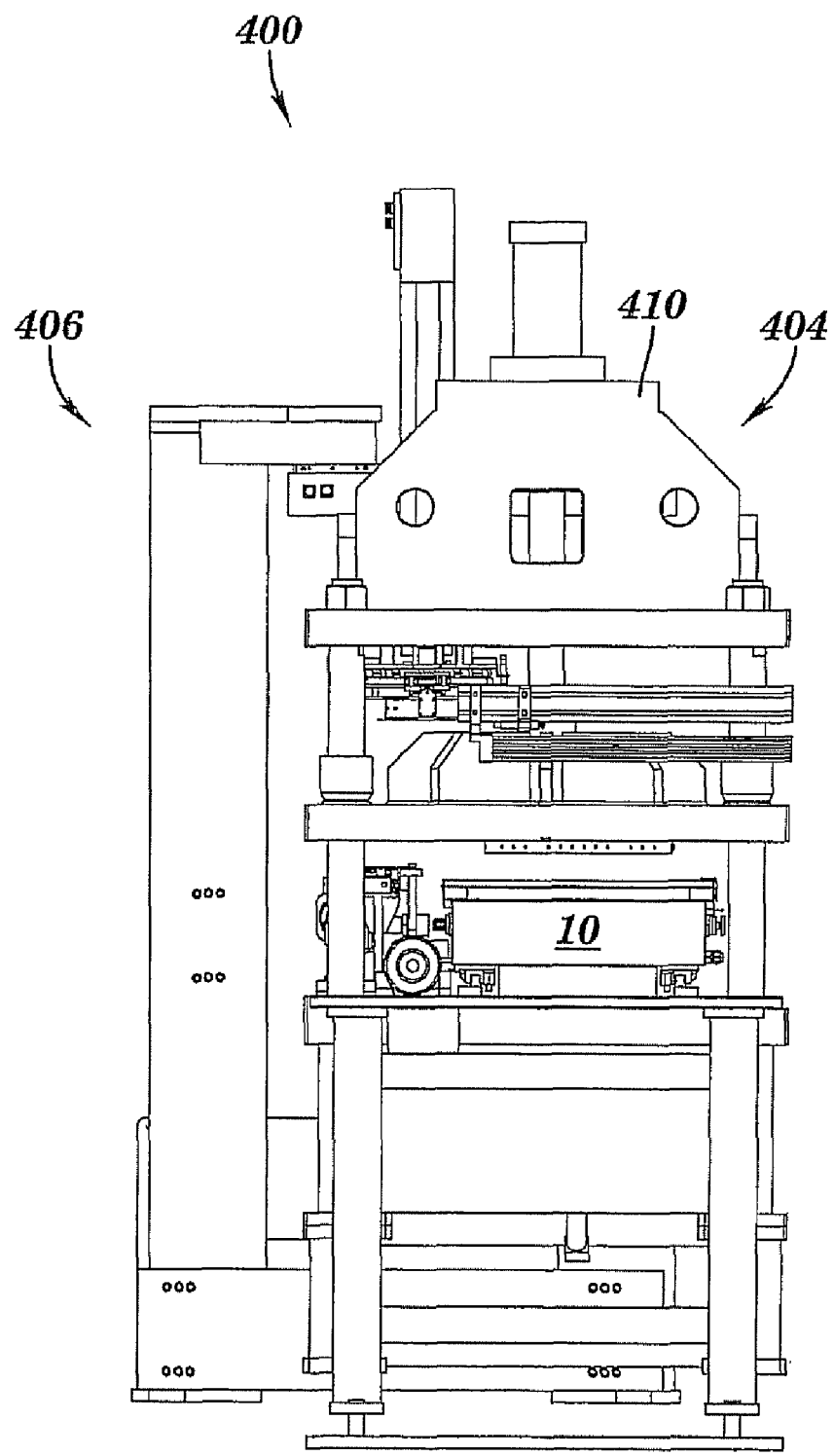
FIG. 31 is a left-side elevation view of the assembly system shown in FIG. 30.
Figure 32:
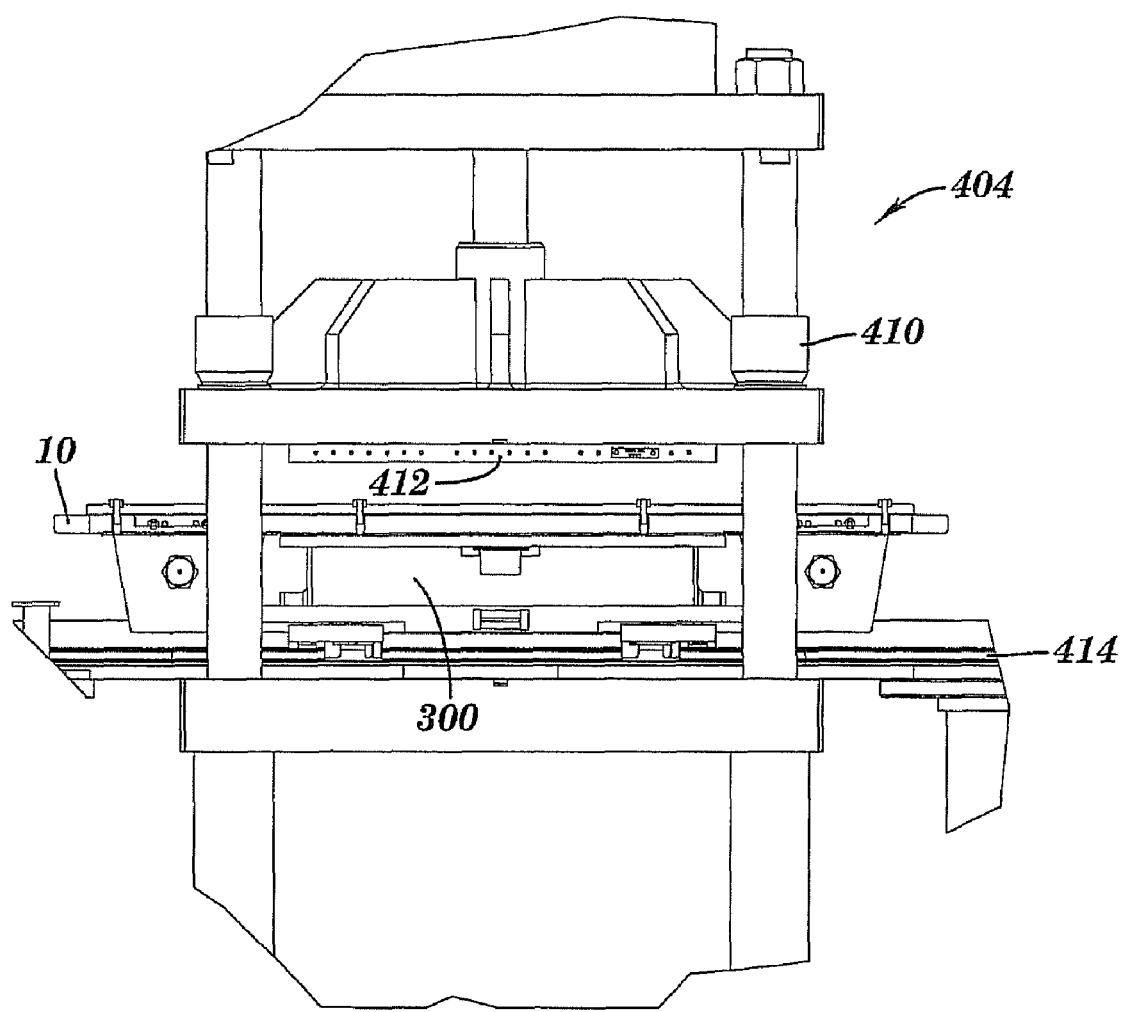
FIG. 32 is detailed view of the assembly system shown in FIG. 30 identified as detail 32-32 in FIG. 30.

FIG. 30 is a front elevation view of a handling system 400 in which the cartridge assembly 10 shown in FIGS. 1 and 2 may be used according to another aspect of the invention. FIG. 31 is a left-side elevation view of handling system 400 shown in FIG. 30, and FIG. 32 is detailed view of handling system shown in FIG. 30 identified as detail 32-32 in FIG. 30. Handling system 400 includes a membrane cutting station 404 and a membrane removal station 406. The support structures of stations 404 and 406 may be fabricated from conventional structural components, for example, structural steel tubing or angle iron, or its equivalent, joined by conventional means, for example, by welding or mechanical fasteners. In one aspect of the invention, the structural supports of stations 404 and 406 are sufficiently rigid to minimize movement or vibration of the structural supports and of the components mounted or moved on stations 404 and 406. In one aspect, the structural supports of stations 404 and 406 are fabricated from 6 inch by 8 inch, thick walled, structural mild steel tubing.

Membrane cutting station 404 includes a press 410, for example, a hydraulic or pneumatic press, that may be used to cut membrane material to size. As shown most clearly in FIG. 32, press 410 typically includes one or more cutting blades 412. According to this aspect of the invention, cartridge assembly 10, having membrane assembly 15, may be mounted on vacuum table 300 and placed in press 410 and the press used to cut membrane assembly 15. In one aspect of the invention, die press 410 may be operated to perform a "kiss cut" of membrane assembly 15 whereby only a section of membrane 12 is cut to size and backing 13 is uncut or cut in an inconsequential manner. In another aspect of the invention, both the membrane 12 and backing 13 may be cut by die press 410.

In one aspect of the invention, membrane-cutting station 404 may include a conveyor for translating the cartridge assembly 10 and vacuum table 300. In one aspect of the invention, cutting station 404 includes one or more screw conveyors 414. In one aspect of the invention, vacuum table 300 may be adapted to engage screw conveyor 414 whereby screw conveyor 414 may translate vacuum table 300 and cartridge assembly 10.

Membrane removal station 406 typically includes at least one robotic arm 416 having arm-end tooling 418. According to one aspect of the invention, arm-end tooling 418 may comprise some means for grasping thin film membranes so that the membrane may be transported to further treatment or handling. In one aspect of the invention, arm-end tooling 418 includes at least one vacuum surface, for example, a vacuum table adapted to remove one or more sections of membrane 12 from cartridge assembly 10. As shown in FIG. 30, screw conveyor 414 may extend from membrane cutting station 404 to membrane removal station 406.

According to one aspect of the invention, cartridge assembly 10 and vacuum table 300 may be used in the following manner. First, with reference to FIGS. 1 through 7, cartridge assembly 10 is assembled according to aspects of the present invention with spool 26 having membrane assembly 15 mounted thereon. With cover 16 in the opened position, membrane assembly 15 may be withdrawn from spool 26 and drawn across base 14 and attached to spool 28, for example, manually by a human attendant or automatedly by means of a robotic arm. When membrane assembly 15 is secured, cover 16 may be closed, and secured by means of latches 57, whereby at least a portion of the membrane assembly 15 is exposed in aperture 30 in cover 16. Prior to or after mounting membrane assembly 15 into cartridge assembly 10, cartridge assembly 10 may be mounted upon vacuum table 300 whereby base 14 engages vacuum table 300, for example, base 14 engages positioning pins 308 on vacuum table 300, and membrane assembly 15 may be exposed to vacuum table 300. In one aspect, aperture 11 in base 14 is shaped to engage with the outer edge of vacuum surface 302. Cartridge assembly 10 may be secured to vacuum table 300 by means of latches 56.

Prior to or after mounting cartridge assembly 10 on vacuum table 300, vacuum table 300 may be engaged with screw conveyor 414. Screw conveyor may then be activated, for example, automatedly or manually, to convey vacuum table 300 and cartridge assembly 10 into membrane cutting station 404. Cartridge assembly 10 may be positioned as desired within station 404 by means of mechanical stops, by means of visual inspection by the operator, by means of positioning sensors, or by means of an automated vision system, among other positioning means. When positioned as desired, press 410 may be activated to apply cutting blade 412 to membrane assembly 15 to cut membrane 12 to the desired dimensions to produce one or more membrane sections, such as, section 34 shown in FIG. 1. Press 410 is then deactivated and blade 412 is withdrawn from membrane assembly 15.

After membrane assembly 15 is cut as desired, vacuum table 300 and cartridge assembly 10 may be translated by screw conveyor 414 to membrane removal station 406. When positioned in membrane removal station 406, one or more membrane sections may be removed from cartridge assembly 10 by means of arm-end tooling 418, for example, by means of vacuum. Robotic arm 416 may then transport the one or more membrane sections to further treatment or processing, for example, to assembly into a Membrane Electrode Assembly (MEA), for instance, for a fuel cell. According to one aspect of the invention, arm-end tooling 418 may remove one or more sections of membrane 12 alone from cartridge assembly 10, for example, when die press 410 performs a kiss cut, or one or more sections of membrane 12 may be removed with backing material 13. In one aspect of the invention, arm-end tooling 418 may be adapted to remove only the membrane 12 while leaving backing 13 on vacuum table 300. For example, in one aspect of the invention, during removal of a membrane section in station 406 from cartridge assembly 10, a vacuum may be applied to vacuum table 300 to minimize or prevent the removal of backing 13 from vacuum table 300.

After removal of the one or more membrane sections in membrane removal station 406, screw conveyor 414 may translate cartridge assembly 10 and vacuum table 300 back to cutting station 404, for example, to cut one or more further membrane sections to size. However, according to one aspect of the invention, prior to further cutting, membrane assembly 15 may be advanced in cartridge assembly 10 to expose a new uncut section of membrane assembly 15 to aperture 30. In one aspect of the invention, membrane assembly 15 may be advanced manually, for example, by a human attendant, by rotating load handle assembly 72 or 73. In another aspect of the invention, membrane assembly 15 may be advanced automatedly, for example, by a robotic manipulator or a motor, for example, a stepper motor.

In the aspect of the invention shown in FIGS. 30 and 31, an index drive assembly 420 may be used to advance membrane assembly 15 in cartridge assembly 10. As shown in FIG. 30, index drive assembly 420 may be mounted, for example, rigidly mounted, in the path of movement of cartridge assembly 10 from cutting station 404 to membrane removal station 406. In one aspect of the invention, index drive assembly 420 may be mounted wherever it can access spline 87 of driven spline take-up assembly 75. For example, index drive assembly 420 may be mounted anywhere on station 404 or station 406, on vacuum table 300, or on cartridge assembly 10, among other locations. Detailed views of index drive assembly 420 are shown in FIGS. 33 through 36.

Figure 33:
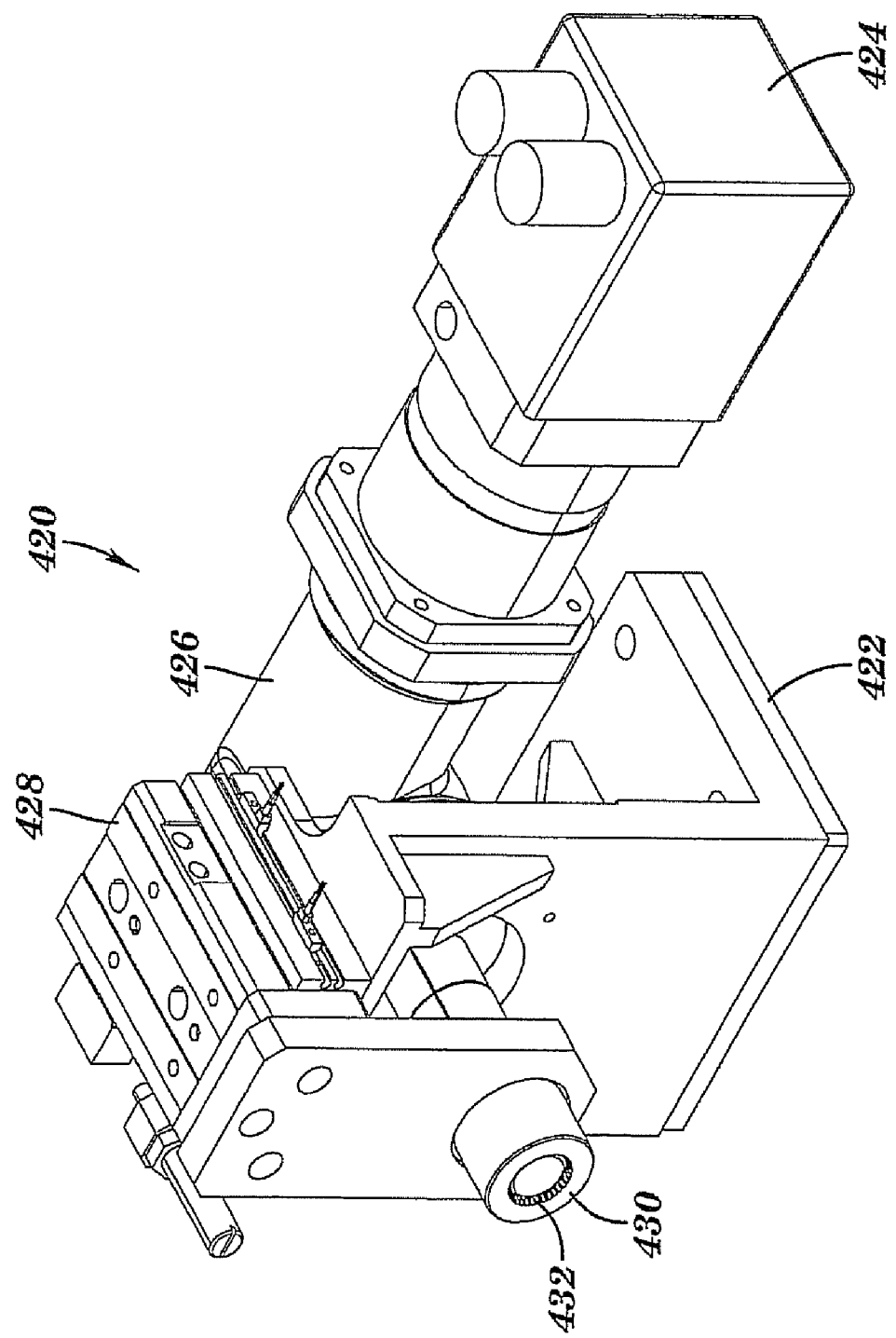
FIG. 33 is a perspective view of the index drive assembly shown in FIG. 30.
Figure 34:
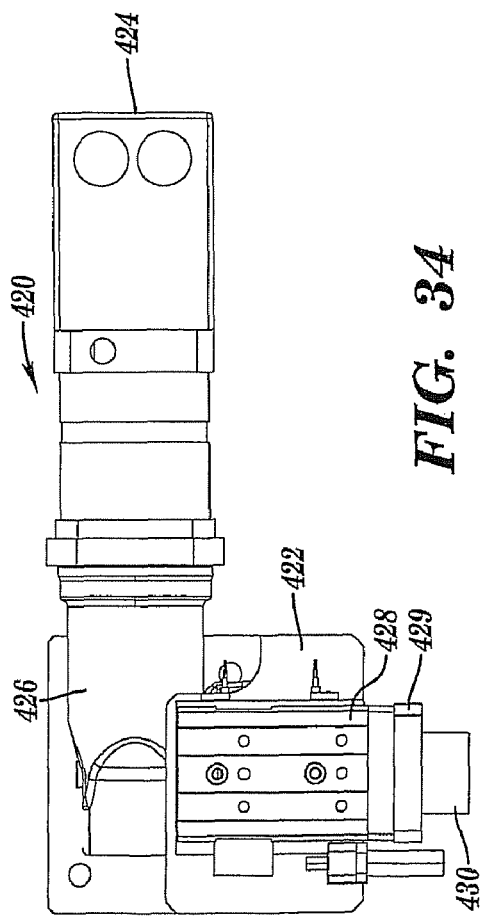
FIG. 34 is a top plan view of the index drive-assembly shown in FIG. 33.
Figure 35:
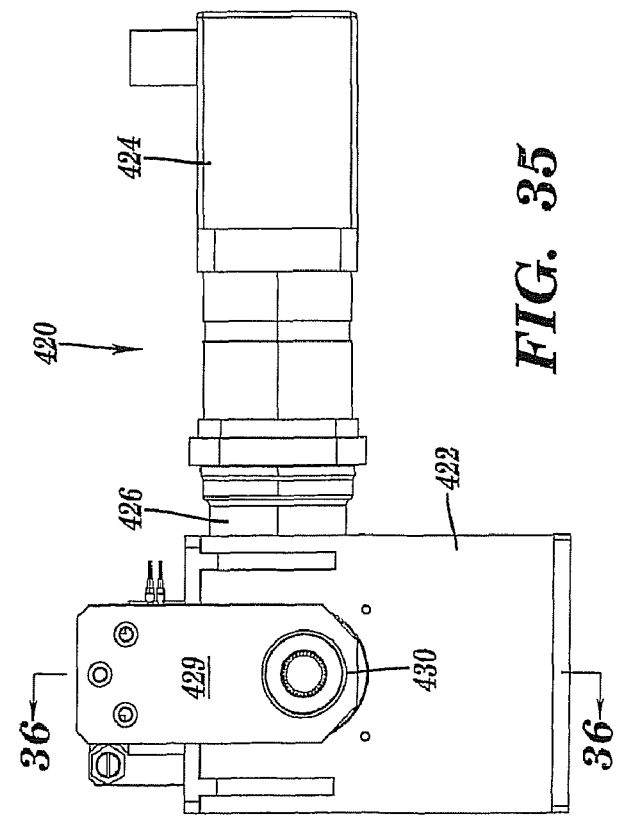
FIG. 35 is a front elevation view of the index drive assembly shown in FIG. 33.
Figure 36:
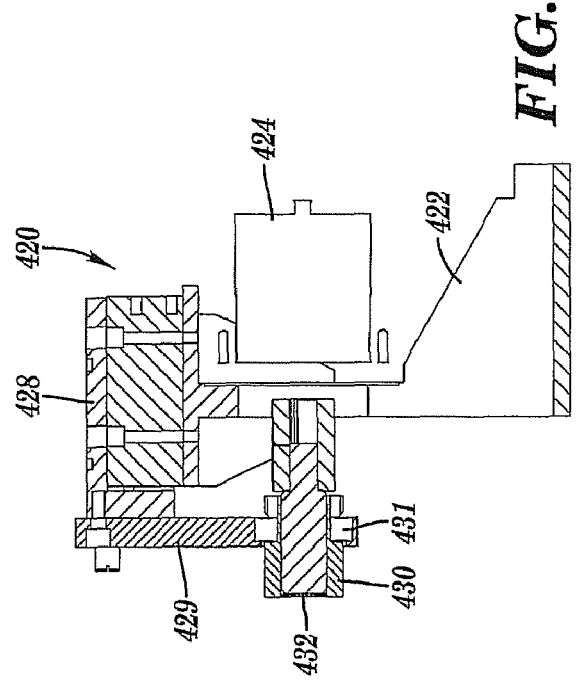
FIG. 36 is a cross-sectional view of the index drive assembly shown in FIG. 35 as viewed along section lines 36-36 in FIG. 35.

FIG. 33 is a perspective view of index drive assembly 420 shown in FIG. 30. FIG. 34 is a top plan view of index drive assembly 420 shown in FIG. 33; FIG. 35 is a front elevation view of index drive assembly 420 shown in FIG. 33; and FIG. 36 is a cross-sectional view of index drive assembly 420 shown in FIG. 35 as viewed along section lines 36-36 in FIG. 35. As shown in FIG. 33, index drive assembly 420 includes a drive mount 422, a drive motor 424, a gear box 426 mounted to drive motor 424, an actuator 428 mounted to drive mount 422 and adapted to deflect a plate 429, and an extendable drive coupling 430 rotatably mounted in plate 429 and adapted to engage gear box 426. As shown in FIG. 35, extendable drive coupling 430 may be rotatably mounted to plate 429 by means of bearing 431, for example, a roller bearing. Extendable drive coupling 428 includes an internal spline 432 that is adapted to engage the external spline 87 of driven spline take-up assembly 75 (see FIGS. 15 and 16). According to this aspect of the invention, when drive coupling 430 is extended by actuator 428 and engaged with spline 87, drive coupling 430 may transmit torque supplied by motor 424, via gear box 426, to shaft 86 (see FIG. 18) to rotate spool 28 to advance membrane assembly 15.

Drive motor 424 may be any motor capable of transmitting the desired torque in the desired response time. In one aspect of the invention, motor 424 may be a servomotor, for example, a high-performance, low-ripple brushless servomotor provide by KollMorgen, which is a division of Danaher Corporation of Washington, D.C., having a model number MT302a1-R1C1, or its equivalent. Gearbox 426 may be any gear configuration capable of transmitting the desired torque. In one aspect of the invention, gear box 426 may be a right-angled gearbox, for example, a Dyna-Lite Series hypoid gearbox provided by GAM Corporate of Harwood Heights, Ill. having part number DL-N34-050, or its equivalent. Actuator 428 may be any actuator configured to deflect coupling 430, for example, a solenoid actuator, a pneumatic actuator, or a hydraulic actuator. In one aspect of the invention, actuator 428 may be guided-cylinder actuator, for example, a guided-cylinder actuator provided by SMC Corporation of Indianapolis, Ind. having part number MXQ25-30BS, or its equivalent.

According to one aspect of the invention the positioning of cartridge assembly 10 whereby spline 87 of driven spline take-up assembly 75 may be aligned with extendable drive coupling 428 by various means. For example, the position of cartridge assembly 10 may be controlled by means of mechanical stops, by means of visual inspection by the operator, by means of positioning sensors, or by means of an automated vision system, among other positioning means.

Handling system 400 may include appropriate monitoring and control devices that are not disclosed in FIGS. 30 trough 32. For example, though in one aspect of the invention stations 404 and 406 may be visually monitored and manually manipulated by a human attendant, in one aspect of the invention, at least some of the monitoring and manipulation performed by handling system 400 may be automated and controlled by one or more electronic controllers, for example, a PC-based controller or a distributed control system. Preferred methods and devices for monitoring and controlling the operation of handling system 400 will be apparent to those of ordinary skill in the automation field.

The present invention provides device and methods for handling thin film materials. Aspects of the present invention provide for the handling of thin film materials when introducing thin films to fabrication or assembly processes, for example, the assembly of Membrane Electrode Assemblies, for instance, for the fabrication of fuel cells. The present invention is especially useful when automating the assembly of such devices, which according to prior art methods, can typically only be processed individually by hand. The present invention facilitates the manufacture of such membrane-containing devices wherein such devices can be produced more quickly and more economically than when using prior art devices or methods. Thus, by employing aspects of the present invention, such devices can be made commercially available at reasonable cost where otherwise such devices would be too expensive to commercially produce. Though aspects of the invention were described as they apply to the handling of thin-film membrane materials, such as, fuel cell membranes, it will be readily apparent to those of skill in the art that aspects of the invention may be applied any thin film-like materials.

While the invention has been particularly shown and described with reference to preferred embodiment, it will be understood by those skilled in the art that various changes in form and details may be made to the invention without departing from the spirit and scope of the invention described in the following claims.

The invention claimed is:

1. A cartridge for handling a thin film membrane, the cartridge comprising:
   a frame having a first end and a second end;
   a first cavity positioned adjacent the first end of the frame comprising a source of the thin film membrane;
   a first spool being mounted in the first cavity, the first spool being adapted to provide the thin film membrane thereon;
   a second cavity being positioned adjacent the second end of the frame comprising a depository for the thin film membrane;
   a second spool being mounted in the second cavity, the second spool being adapted to accept the thin film membrane; and
   a cover mounted above the frame, the cover having an aperture for providing access to the thin film membrane;
   said frame further comprising an aperture positioned opposite the aperture in the cover being adapted to engage a vacuum table.

2. The cartridge as recited in claim 1, further comprising at least one guide roller positioned between the first end and the second end.

3. The cartridge as recited in claim 1, further comprising at least one wiper assembly positioned between the first end and the second end.

4. The cartridge as recited in claim 1, wherein the thin film membrane comprises a thin film membrane in an acidic solution.

5. The cartridge as recited in claim 1, wherein the cover is pivotally mounted to the frame.

6. The cartridge as recited in claim 1, further comprising means for conveying the thin film membrane from the first cavity to the second cavity.

7. The cartridge as recited in claim 6, wherein the means for conveying the thin-film membrane comprises automated means for rotating the second spool.

* * * * *